US011265855B2

(12) United States Patent
Xiong et al.

(10) Patent No.: US 11,265,855 B2
(45) Date of Patent: Mar. 1, 2022

(54) SEQUENCE DESIGN AND RESOURCE ALLOCATION FOR NR PUCCH

(71) Applicant: Apple Inc., Cupertino, CA (US)

(72) Inventors: Gang Xiong, Beaverton, OR (US); Joonyoung Cho, Santa Clara, CA (US); Lopamudra Kundu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/634,865

(22) PCT Filed: Jul. 31, 2018

(86) PCT No.: PCT/US2018/044563
§ 371 (c)(1),
(2) Date: Jan. 28, 2020

(87) PCT Pub. No.: WO2019/027995
PCT Pub. Date: Feb. 7, 2019

(65) Prior Publication Data
US 2020/0236670 A1    Jul. 23, 2020

Related U.S. Application Data

(60) Provisional application No. 62/587,661, filed on Nov. 17, 2017, provisional application No. 62/540,424, filed on Aug. 2, 2017.

(51) Int. Cl.
*H04W 72/04* (2009.01)
*H04L 1/18* (2006.01)

(52) U.S. Cl.
CPC ....... *H04W 72/0413* (2013.01); *H04L 1/1812* (2013.01); *H04W 72/042* (2013.01)

(58) Field of Classification Search
CPC ............ H04W 72/0413; H04W 72/042; H04L 1/1812
See application file for complete search history.

(56) References Cited

U.S. PATENT DOCUMENTS

2013/0301571 A1* 11/2013 Sorrentino .............. H04L 5/001
2014/0036737 A1*  2/2014 Ekpenyong ........... H04W 8/245
(Continued)

FOREIGN PATENT DOCUMENTS

CN        103001755 A       3/2013
CN        104521156 A       4/2015
(Continued)

OTHER PUBLICATIONS

Nokia, Alcatel-Lucent Shanghai Bell; "On long PUCCH design for small payloads"; 3GPP TSG RAN WG1 NR AD-Hoc#2 R1-1710895; Qingdao, P.R. China; Jun. 27, 2017; 2 Pages.
(Continued)

*Primary Examiner* — Ronald B Abelson
(74) *Attorney, Agent, or Firm* — Kowert, Hood, Munyon, Rankin & Goetzel, P.C.

(57) ABSTRACT

A user equipment (UE) can include processing circuitry configured to decode physical uplink control channel (PUCCH) configuration information received from a Next Generation Node-B (gNB). The configuration information includes a cell-specific base sequence hopping pattern. A PUCCH base sequence is selected from a plurality of available PUCCH base sequences based on the cell-specific base sequence hopping pattern and UCI information. A cyclic shift is applied to the PUCCH base sequence to generate a cyclically shifted PUCCH sequence. The cyclically shifted PUCCH sequence is encoded for transmission to the gNB using a PUCCH physical resource. The cyclically shifted PUCCH sequence carries the UCI and is code division multiplexed (CDM) with at least another cyclically (Continued)

shifted PUCCH sequence within the PUCCH physical resource.

20 Claims, 28 Drawing Sheets

(56) References Cited

U.S. PATENT DOCUMENTS

| | | | |
|---|---|---|---|
| 2014/0164864 A1* | 6/2014 | Takeda | H04L 1/1854 |
| 2016/0234798 A1 | 8/2016 | Dabak et al. | |
| 2018/0279291 A1* | 9/2018 | Tiirola | H04B 1/713 |
| 2019/0261397 A1* | 8/2019 | Takeda | H04L 5/0053 |
| 2020/0092876 A1* | 3/2020 | Cho | H04W 72/0413 |

FOREIGN PATENT DOCUMENTS

| | | |
|---|---|---|
| CN | 104756536 A | 7/2015 |
| CN | 106105085 A | 11/2016 |
| EP | 3232594 A1 | 10/2017 |
| EP | 3389208 A1 | 10/2018 |
| WO | 2013169086 A1 | 11/2013 |
| WO | 2014010903 A1 | 1/2014 |
| WO | 2016093573 A1 | 6/2016 |
| WO | 2017099524 A1 | 6/2017 |

OTHER PUBLICATIONS

Ericsson; "On PUCCH for Ultra-Reliable Transmission"; 3GPP TSG RAN WG1 NR Ad-Hoc#2 R1-1711497; Qingdao, P.R. China; Jun. 27, 2017; 3 Pages.

Extended European Search Report for Patent Application No. EP 18841049; dated Nov. 27, 2020; 13 pages.

International Search Report and Written Opinion for Application No. PCT/US2018/044563, dated Nov. 15, 2018, 11 pages.

Ericcson, 'Overview of Short PUCCH Design,' R1-1709079, 3GPP TSG RAN WGI Meeting #89, Hangzhou, China, May 7, 2017, 5 pgs.

Ericcson, 'On the Design of Long PUCCH for 1-2 bits UCI', R1-1709084, 3GPP TSG RAN WGI Meeting #89, Hangzhou, China, May 7, 2017, 4 pgs.

Qualcomm Incorporated, 'Resource Allocation for PUCCH', R1-1708621, 3GPP TSG RAN WG1 Meeting #89, Hangzhou, China, May 7, 2017, 3 pgs.

Catt, 'Multiplexing of different UL control channels', R1-1707506, 3GPP TSG RAN WG1 Meeting #89, Hangzhou, China, May 6, 2017, 2 pgs.

Huawei et al., 'PUCCH resource allocation for HARQ=ACK and SR', R1-1706960, 3GPP TSG RAN WG1 Meeting #89, Hangzhou, China, May 8, 2017, 4 pgs.

Huawei, Hisilicon; "Transmit diversity for PUCCH"; 3GPP TSG RAN WG1 NR Ad-Hoc Meeting R1-1710463; Qingdao, China, Jun. 30, 2017. 6 Pages.

3GPP, TS36.211 v~, E-UTRA; "Physical channels and modulation": Release 13 36211-d60-s00-s05. Jun. 12, 2017. 59 pages.

Cohere Technologies; "Design of Long-PUCCH for UCI of more than 2 bits"; 3GPP TSG-RAN Ad Hoc Meeting 2 R1-1711251; Qingdao, China. Jun. 30, 2017. 5 pages.

Qualcomm Incorporated; "Channelization of Short PUCCH"; 3GPP TSG RAN WG1, Meeting #88bis R1-1705610; Apr. 2017; Spokane, USA; 9 pgs.

Motorola Mobility, et al.; "Short PUCCH for Up to 2 Bit UCI"; 3GPP TSG RAN WG1 NR Ad-Hoc#2; R1-1711282 Jun. 2017; Qingdao, China; 8 pgs.

Korean Office Action; Korean Application No. 10-2020-7005994; dated Nov. 19, 2021; 10 pgs.

* cited by examiner

SEQUENCE DESIGN AND RESOURCE ALLOCATION FOR NR PUCCH

PRIORITY CLAIM

This application claims the benefit of priority to U.S. Provisional Patent Application Ser. No. 62/540,424, filed Aug. 2, 2017, and entitled "ON THE SEQUENCE DESIGN OF NR PUCCH WITH SHORT AND LONG DURATIONS".

This application also claims the benefit of priority to U.S. Provisional Patent Application Ser. No. 62/587,661, filed Nov. 17, 2017, and entitled "RESOURCE ALLOCATION AND INDICATION FOR UPLINK PHYSICAL CONTROL CHANNEL".

Each of the above-identified provisional patent applications is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to sequence design of NR physical uplink control channel (PUCCH) with short and long durations. Further aspects are directed to resource allocation and indication for PUCCH.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth generation (5G) wireless systems are forthcoming, and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques to address sequence design for short and long duration PUCCH, as well as resource allocation and indication for PUCCH.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

Figure 1A:
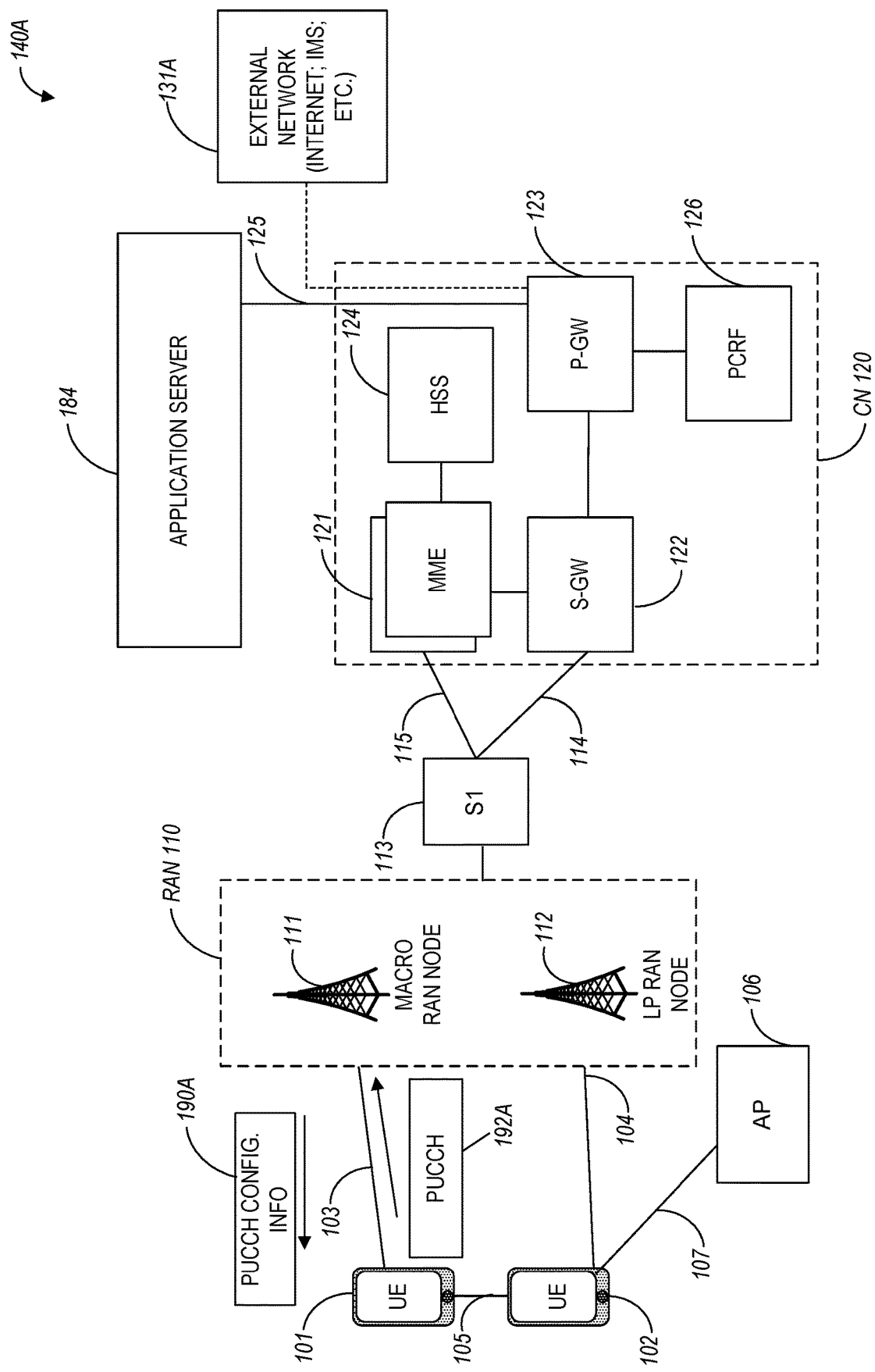
FIG. 1A illustrates an architecture of a network in accordance with some aspects.

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Any of the radio links described herein may operate according to any one or more of the following exemplary radio communication technologies and/or standards including, but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 ($3^{rd}$ Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 ($3^{rd}$ Generation Partnership Project Release 16), 3GPP Rel. 17 (3rd Generation Partnership Project Release 17), 3GPP Rel. 18 (3rd Generation Partnership Project Release 18), 3GPP 5G or 5G-NR, 3GPP LTE Extra, LTE-Advanced Pro, LTE Licensed-Assisted Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, Data TAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, and the like), technologies operating above 300 GHz and THz bands, (3GPP/LTE based or IEEE 802.11p and other), Vehicle-to-Vehicle (V2V), Vehicle-to-X (V2X), Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

LTE and LTE-Advanced are standards for wireless communications of high-speed data for user equipment (UE) such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on unlicensed spectrum via CA, while Rel-14 enhanced LAA (eLAA) system focuses on the design of uplink operation on unlicensed spectrum via CA.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) where in particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

FIG. 1A illustrates an architecture of a network in accordance with some aspects. The network 140A is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, drones, or any other computing device including a wired and/or wireless communications interface.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, NB-IoT devices can be configured to operate in a single physical resource block (PRB) and may be instructed to retune two different PRBs within the system bandwidth. In some aspects, an eNB-IoT UE can be configured to acquire system information in one PRB, and then it can retune to a different PRB to receive or transmit data.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some aspects, the network 140A can include a core network (CN) 120. Various aspects of NG RAN and NG Core are discussed herein in reference to, e.g., FIG. 1B, FIG. 1C, FIG. 1D, FIG. 1E, FIG. 1F, and FIG. 1G.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe for sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe the mapping of certain physical channels to resource elements. Each resource block may comprise a collection of resource elements; in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMES 121.

In this aspect, the CN 120 comprises the MMES 121, the S-GW 122, the Packet Data Network (PDN) Gateway (P-GW) 123, and a home subscriber server (HSS) 124. The MMES 121 may be similar in function to the control plane of legacy Serving General Packet Radio Service (GPRS) Support Nodes (SGSN). The MMES 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate a SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PUSCH) as well as for sounding reference signal (SRS) transmission.

In some aspects, the communication network 140A can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum); (b) in-band deployment (the network operates within the LTE channel); and (c) guard-band deployment (the network operates in the guard band of legacy LTE channels). In some aspects, such as with further enhanced NB-IoT (FeNB-IoT), support for NB-IoT in small cells can be provided (e.g., in microcell, picocell or femtocell deployments). One of the challenges NB-IoT systems face for small cell support is the UL/DL link imbalance, where for small cells the base stations have lower power available compared to macrocells, and, consequently, the DL coverage can be affected and/or reduced. In addition, some NB-IoT UEs can be configured to transmit at maximum power if repetitions are used for UL transmission. This may result in large inter-cell interference in dense small cell deployments.

In some aspects, the UE 101 can receive configuration information 190A via, e.g., higher layer signaling or other types of signaling. The configuration information 190A can include physical uplink control channel (PUCCH)-related information as disclosed herein below. For example, the configuration information 190A can include PUCCH-related information communicated via L1/L2 signaling or higher layer signaling via NR minimum system information (MSI), NR remaining minimum system information (RMSI), NR other system information (OSI), or radio resource control (RRC) signaling. Examples of the configuration information 190A include candidate sets of PUCCH resources, PUCCH resource indication (e.g., as received via downlink control information, DCI, or other type of PDCCH information), cyclic shift hopping pattern, PUCCH sequence hopping pattern, and so forth. In response to the configuration information, the UE 101 can communicate PUCCH information 192A back to the gNB 111, as described herein below.

Figure 1B:
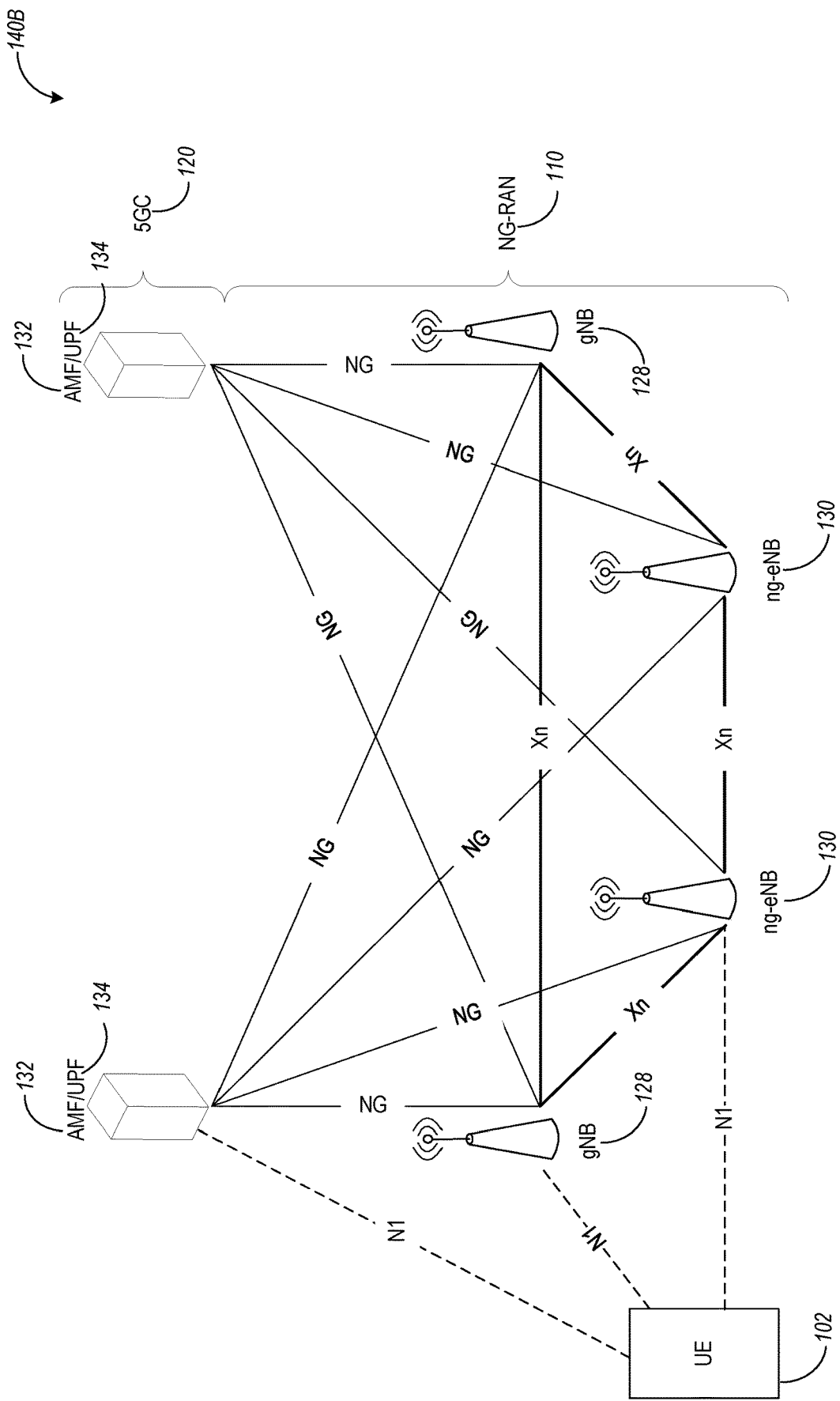
FIG. 1B is a simplified diagram of an overall next generation (NG) system architecture in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130. The gNBs 128 and the NG-eNBs 130 can be communicatively coupled to the UE 102 via, e.g., an N1 interface.

The core network 120 (e.g., a 5G core network or 5GC) can include an access and mobility management function (AMF) 132 and/or a user plane function (UPF) 134. The AMF 132 and the UPF 134 can be communicatively coupled to the gNBs 128 and the NG-eNBs 130 via NG interfaces. More specifically, in some aspects, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via Xn interfaces.

In some aspects, a gNB 128 can include a node providing new radio (NR) user plane and control plane protocol termination towards the UE, and is connected via the NG interface to the 5GC 120. In some aspects, an NG-eNB 130 can include a node providing evolved universal terrestrial radio access (E-UTRA) user plane and control plane protocol terminations towards the UE, and is connected via the NG interface to the 5GC 120.

In some aspects, each of the gNBs 128 and the NG-eNBs 130 can be implemented as a base station, a mobile edge server, a small cell, a home eNB, and so forth.

Figure 1C:
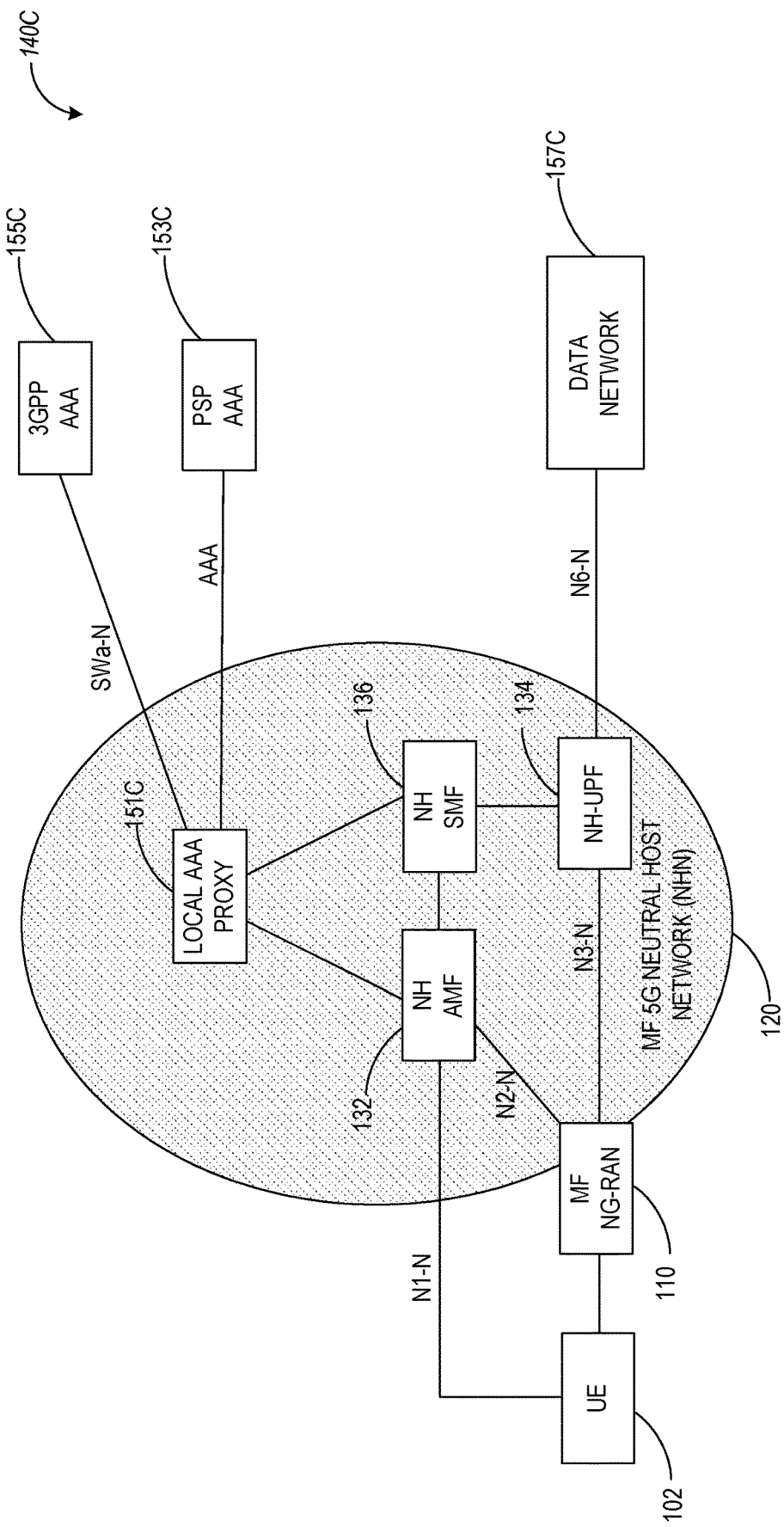
FIG. 1C illustrates an example MulteFire Neutral Host Network (NHN) 5G architecture in accordance with some aspects.

FIG. 1C illustrates an example MulteFire Neutral Host Network (NHN) 5G architecture 140C in accordance with some aspects. Referring to FIG. 1C, the MulteFire 5G architecture 140C can include the UE 102, NG-RAN 110, and core network 120. The NG-RAN 110 can be a MulteFire NG-RAN (MF NG-RAN), and the core network 120 can be a MulteFire 5G neutral host network (NHN).

In some aspects, the MF NHN 120 can include a neutral host AMF (NH AMF) 132, a NH SMF 136, a NH UPF 134, and a local AAA proxy 151C. The AAA proxy 151C can provide connection to a 3GPP AAA server 155C and a participating service provider AAA (PSP AAA) server 153C. The NH-UPF 134 can provide a connection to a data network 157C.

The MF NG-RAN 120 can provide similar functionalities as an NG-RAN operating under a 3GPP specification. The NH-AMF 132 can be configured to provide similar functionality as a AMF in a 3GPP 5G core network (e.g., as described in reference to FIG. 1D). The NH-SMF 136 can be configured to provide similar functionality as a SMF in a 3GPP 5G core network (e.g., as described in reference to FIG. 1D). The NH-UPF 134 can be configured to provide similar functionality as a UPF in a 3GPP 5G core network (e.g., as described in reference to FIG. 1D).

Figure 1D:
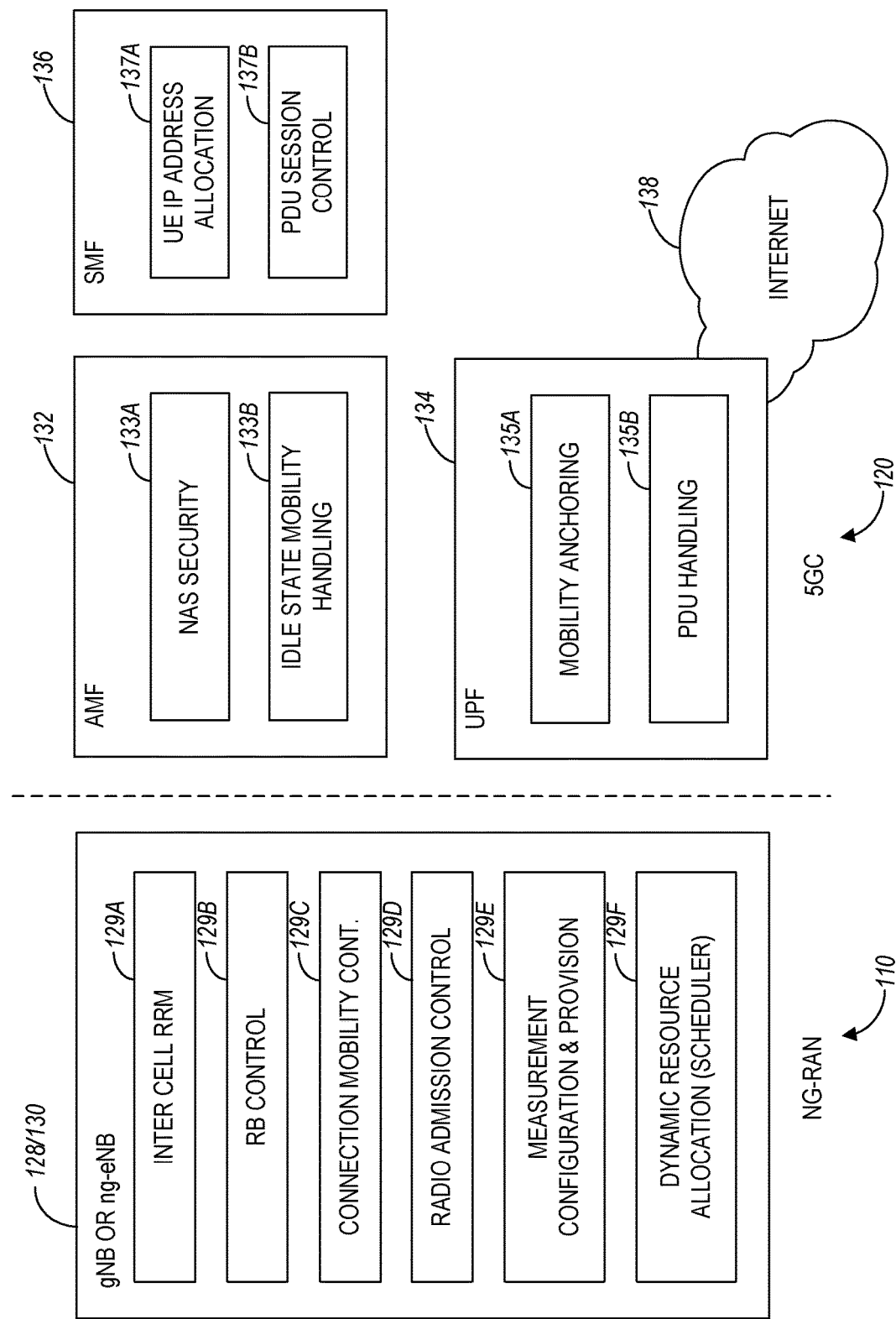
FIG. 1D illustrates a functional split between next generation radio access network (NG-RAN) and the 5G Core network (5GC) in accordance with some aspects.

FIG. 1D illustrates a functional split between NG-RAN and the 5G Core (5GC) in accordance with some aspects. Referring to FIG. 1D, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, dynamic allocation of resources to UEs in both uplink and downlink (scheduling) 129F); IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 132 can be configured to host the following functions, for example: NAS signaling termination; NAS signaling security 133A; access stratum (AS) security control; inter core network (CN) node signaling for mobility between 3GPP access networks; idle state/mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); and/or downlink packet buffering and downlink data notification triggering, among other functions.

The Session Management function (SMF) 136 can be configured to host the following functions, for example: session management; UE IP address allocation and management 137A; selection and control of user plane function (UPF); PDU session control 137B, including configuring traffic steering at UPF 134 to route traffic to proper destination; control part of policy enforcement and QoS; and/or downlink data notification, among other functions.

Figure 1E:
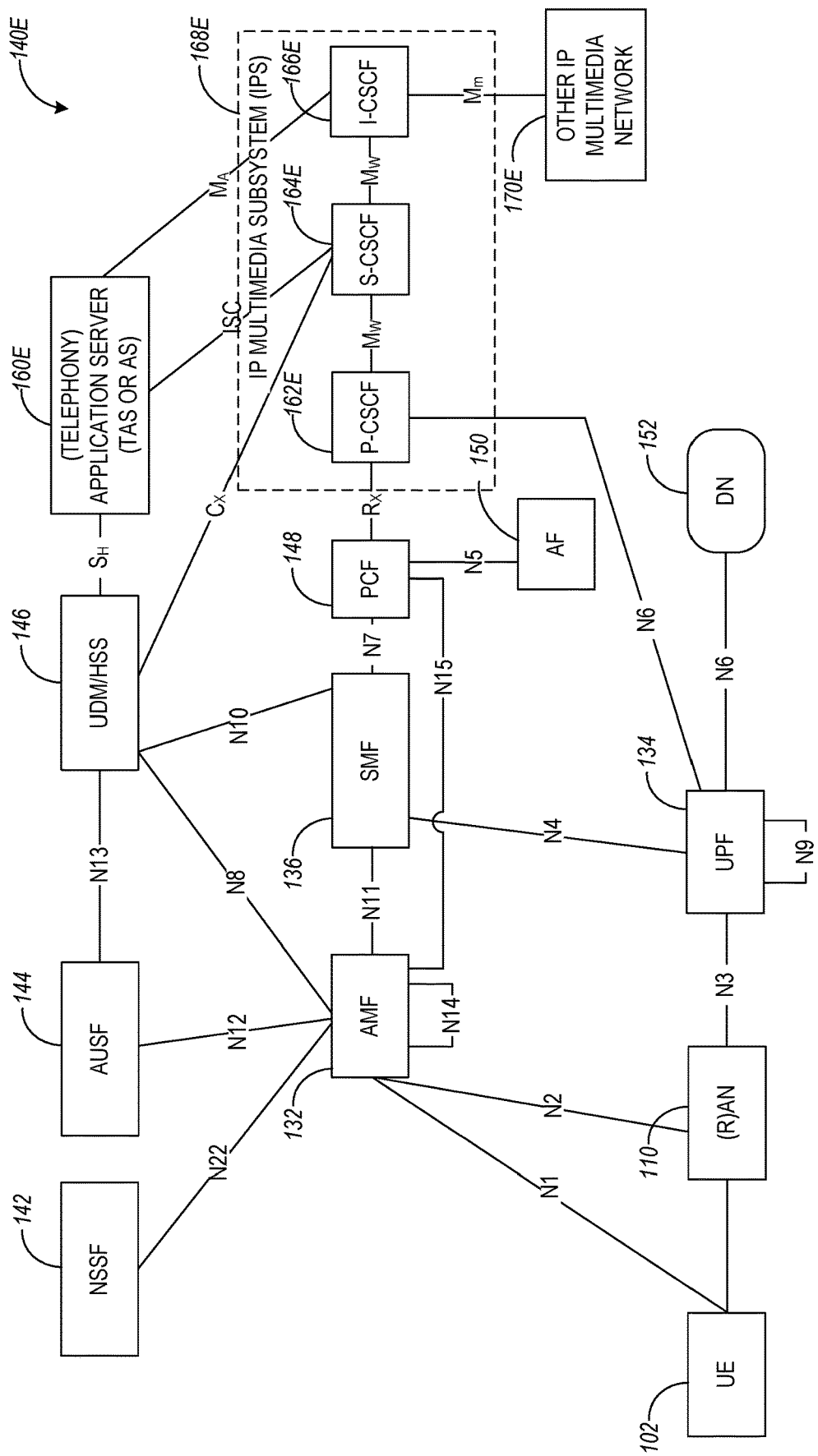
FIG. 1E and FIG. 1F illustrate a non-roaming 5G system architecture in accordance with some aspects.
Figure 1F:
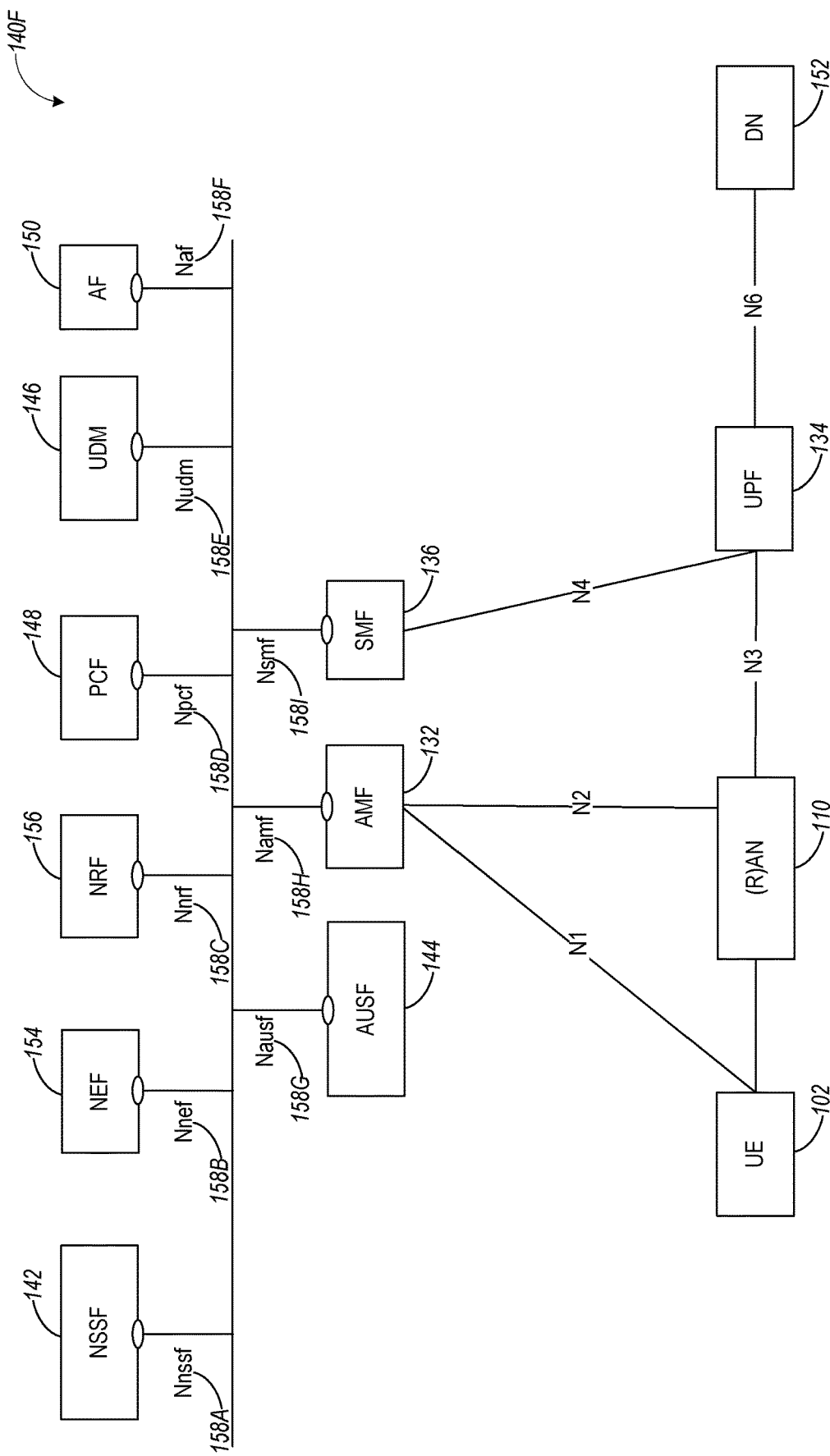

FIG. 1E and FIG. 1F illustrate a non-roaming 5G system architecture in accordance with some aspects. Referring to FIG. 1E, there is illustrated a 5G system architecture 140E in a reference point representation. More specifically, UE 102 can be in communication with RAN 110 as well as one or more other 5G core (5GC) network entities. The 5G system architecture 140E includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF can be used to manage access control and mobility, and can also include network slice selection functionality. The SMF can be configured to set up and manage various sessions according to a network policy. The UPF can be deployed in one or more configurations according to a desired service type. The PCF can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140E includes an IP multimedia subsystem (IMS) 168E as well as a plurality of IP multimedia core network subsystem entities, such as call session control functions (CSCFs). More specifically, the IMS 168E includes a CSCF, which can act as a proxy CSCF (P-CSCF) 162E, a serving CSCF (S-CSCF) 164E, an emergency CSCF (E-CSCF) (not illustrated in FIG. 1E), and/or interrogating CSCF (I-CSCF) 166E. The P-CSCF 162E can be configured to be the first contact point for the UE 102 within the IM subsystem (IMS) 168E. The S-CSCF 164E can be configured to handle the session states in the network, and the E-CSCF can be configured to handle certain aspects of emergency sessions such as routing an emergency request to the correct emergency center or PSAP. The I-CSCF 166E can be configured to function as the contact point within an operator's network for all IMS connections destined to a subscriber of that network operator, or a roaming subscriber currently located within that network operator's service area. In some aspects, the I-CSCF 166E can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160E can be coupled to the IMS 168E via the S-CSCF 164E and/or the I-CSCF 166E.

In some aspects, the 5G system architecture 140E can use a unified access barring mechanism using one or more of the techniques described herein, which access barring mechanism can be applicable for all RRC states of the UE 102, such as RRC_IDLE, RRC_CONNECTED, and RRC_INACTIVE states.

In some aspects, the 5G system architecture 140E can be configured to use 5G access control mechanism techniques described herein, based on access categories that can be categorized by a minimum default set of access categories, which are common across all networks. This functionality can allow the public land mobile network PLMN, such as a visited PLMN (VPLMN) to protect the network against different types of registration attempts, enable acceptable service for the roaming subscriber and enable the VPLMN to control access attempts aiming at receiving certain basic services. It also provides more options and flexibility to individual operators by providing a set of access categories, which can be configured and used in operator specific ways.

Referring to FIG. 1F, there is illustrated a 5G system architecture 140F and a service-based representation. System architecture 140F can be substantially similar to (or the same as) system architecture 140E. In addition to the network entities illustrated in FIG. 1E, system architecture 140F can also include a network exposure function (NEF) 154 and a network repository function (NRF) 156.

In some aspects, 5G system architectures can be service-based and interaction between network functions can be represented by corresponding point-to-point reference points Ni (as illustrated in FIG. 1E) or as service-based interfaces (as illustrated in FIG. 1F).

A reference point representation shows that an interaction can exist between corresponding NF services. For example, FIG. 1E illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150), N6 (between the UPF 134 and the DN 152), N7 (between the SMF 136 and the PCF 148), N8 (between the UDM 146 and the AMF 132), N9 (between two UPFs 134), N10 (between the UDM 146 and the SMF 136), N11 (between the AMF 132 and the SMF 136), N12 (between the AUSF 144 and the AMF 132), N13 (between the AUSF 144 and the UDM 146), N14 (between two AMFs 132), N15 (between the PCF 148 and the AMF 132 in case of a non-roaming scenario, or between the PCF 148 and a visited network and AMF 132 in case of a roaming scenario), N16 (between two SMFs; not illustrated in FIG. 1E), and N22 (between AMF 132 and NSSF 142). Other reference point representations not shown in FIG. 1E can also be used.

In some aspects, as illustrated in FIG. 1F, service-based representations can be used to represent network functions within the control plane that enable other authorized network functions to access their services. In this regard, 5G system architecture 140F can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1F can also be used.

Figure 1G:
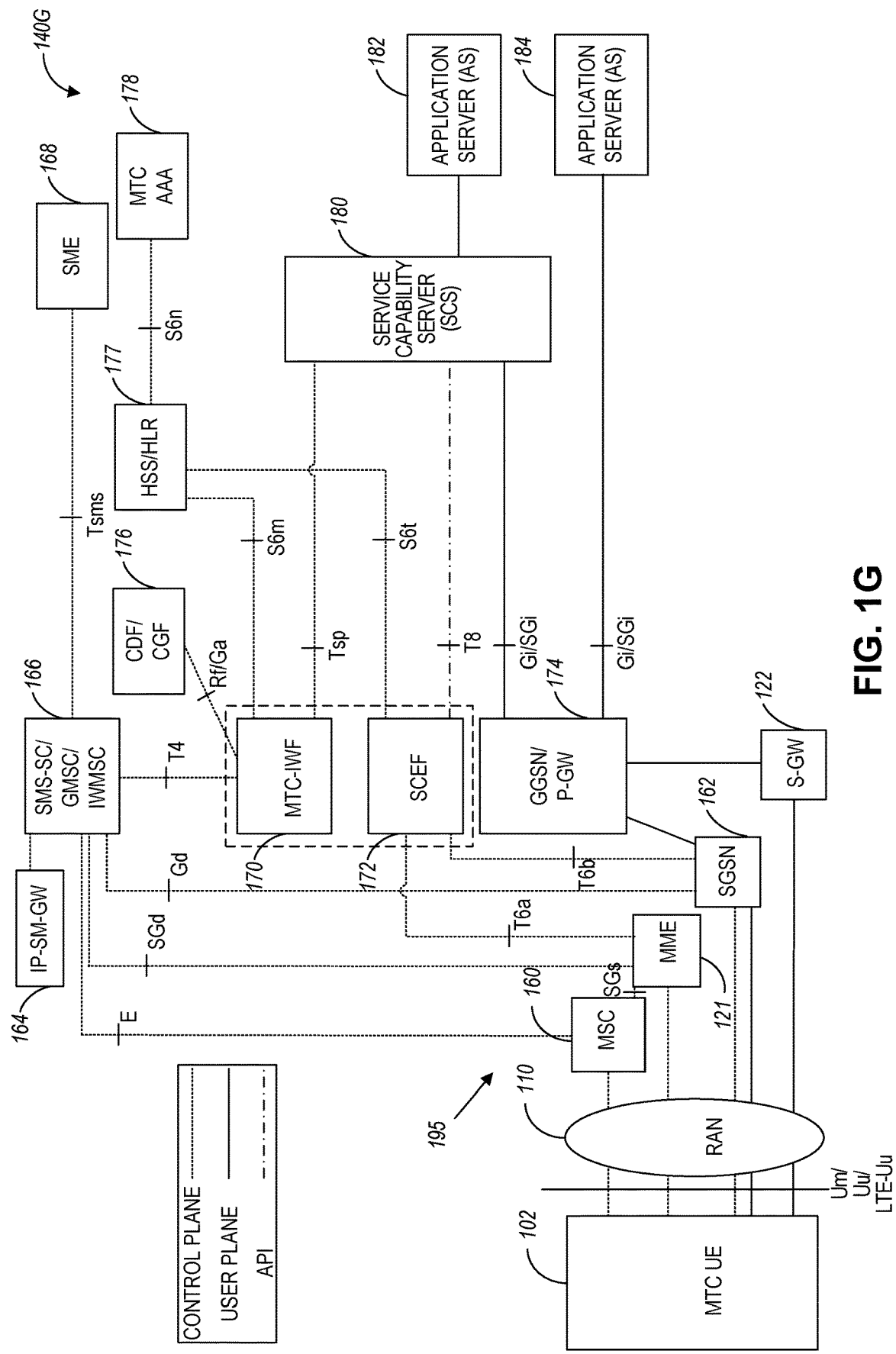
FIG. 1G illustrates an example Cellular Internet-of-Things (CIoT) network architecture in accordance with some aspects.

FIG. 1G illustrates an example CIoT network architecture in accordance with some aspects. Referring to FIG. 1G, the CIoT architecture 140G can include the UE 102 and the RAN 110 coupled to a plurality of core network entities. In some aspects, the UE 102 can be machine-type communication (MTC) UE. The CIoT network architecture 140G can further include a mobile services switching center (MSC) 160, MME 121, a serving GPRS support note (SGSN) 162, a S-GW 122, an IP-Short-Message-Gateway (IP-SM-GW) 164, a Short Message Service Service Center (SMS-SC)/gateway mobile service center (GMSC)/Interworking MSC (IWMSC) 166, MTC interworking function (MTC-IWF) 170, a Service Capability Exposure Function (SCEF) 172, a gateway GPRS support node (GGSN)/Packet-GW (P-GW) 174, a charging data function (CDF)/charging gateway function (CGF) 176, a home subscriber server (HSS)/a home location register (HLR) 177, short message entities (SME) 168, MTC authorization, authentication, and accounting (MTC AAA) server 178, a service capability server (SCS) 180, and application servers (AS) 182 and 184.

In some aspects, the SCEF 172 can be configured to securely expose services and capabilities provided by various 3GPP network interfaces. The SCEF 172 can also provide means for the discovery of the exposed services and capabilities, as well as access to network capabilities through various network application programming interfaces (e.g., API interfaces to the SCS 180).

FIG. 1G further illustrates various reference points between different servers, functions, or communication nodes of the CIoT network architecture 140G. Some example reference points related to MTC-IWF 170 and SCEF 172 include the following: Tsms (a reference point used by an entity outside the 3GPP network to communicate with UEs used for MTC via SMS), Tsp (a reference point used by a SCS to communicate with the MTC-IWF related control plane signaling), T4 (a reference point used between MTC-IWF 170 and the SMS-SC 166 in the HPLMN), T6a (a reference point used between SCEF 172 and serving MME 121), T6b (a reference point used between SCEF 172 and serving SGSN 162), T8 (a reference point used between the SCEF 172 and the SCS/AS 180/182), S6m (a reference point used by MTC-IWF 170 to interrogate HSS/HLR 177), S6n (a reference point used by MTC-AAA server 178 to interrogate HSS/HLR 177), and S6t (a reference point used between SCEF 172 and HSS/HLR 177).

In some aspects, the CIoT UE 102 can be configured to communicate with one or more entities within the CIoT architecture 140G via the RAN 110 according to a Non-Access Stratum (NAS) protocol, and using one or more reference points, such as a narrowband air interface, for example, based on one or more communication technologies, such as Orthogonal Frequency-Division Multiplexing (OFDM) technology. As used herein, the term "CIoT UE" refers to a UE capable of CIoT optimizations, as part of a CIoT communications architecture.

In some aspects, the NAS protocol can support a set of NAS messages for communication between the CIoT UE 102 and an Evolved Packet System (EPS) Mobile Management Entity (MME) 121 and SGSN 162.

In some aspects, the CIoT network architecture 140F can include a packet data network, an operator network, or a cloud service network, having, for example, among other things, a Service Capability Server (SCS) 180, an Application Server (AS) 182, or one or more other external servers or network components.

The RAN 110 can be coupled to the HSS/HLR servers 177 and the AAA servers 178 using one or more reference points including, for example, an air interface based on an S6a reference point, and configured to authenticate/authorize CIoT UE 102 to access the CIoT network. The RAN 110 can be coupled to the CIoT network architecture 140G using one or more other reference points including, for example, an air interface corresponding to an SGi/Gi interface for 3GPP accesses. The RAN 110 can be coupled to the SCEF 172 using, for example, an air interface based on a T6a/T6b reference point, for service capability exposure. In some aspects, the SCEF 172 may act as an API GW towards a third-party application server such as AS 182. The SCEF 172 can be coupled to the HSS/HLR 177 and MTC AAA 178 servers using an S6t reference point, and can further expose an Application Programming Interface to network capabilities.

In certain examples, one or more of the CIoT devices disclosed herein, such as the CIoT UE 102, the CIoT RAN 110, etc., can include one or more other non-CIoT devices, or non-CIoT devices acting as CIoT devices, or having functions of a CIoT device. For example, the CIoT UE 102 can include a smart phone, a tablet computer, or one or more other electronic device acting as a CIoT device for a specific function, while having other additional functionality.

In some aspects, the RAN 110 can include a CIoT enhanced Node B (CIoT eNB) 111 communicatively coupled to the CIoT Access Network Gateway (CIoT GW) 195. In certain examples, the RAN 110 can include multiple base stations (e.g., CIoT eNBs) connected to the CIoT GW 195, which can include MSC 160, MME 121, SGSN 162, and/or S-GW 122. In certain examples, the internal architecture of RAN 110 and CIoT GW 195 may be left to the implementation and need not be standardized.

As used herein, the term "circuitry" may refer to, be part of, or include an Application Specific Integrated Circuit (ASIC) or other special purpose circuit, an electronic circuit, a processor (shared, dedicated, or group), or memory (shared, dedicated, or group) executing one or more software or firmware programs, a combinational logic circuit, or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware. In some aspects, circuitry as well as modules disclosed herein may be implemented in combinations of hardware, software and/or firmware. In some aspects, functionality associated with a circuitry can be distributed across more than one piece of hardware or software/firmware module. In some aspects, modules (as disclosed herein) may include logic, at least partially operable in hardware. Aspects described herein may be implemented into a system using any suitably configured hardware or software.

Figure 1H:
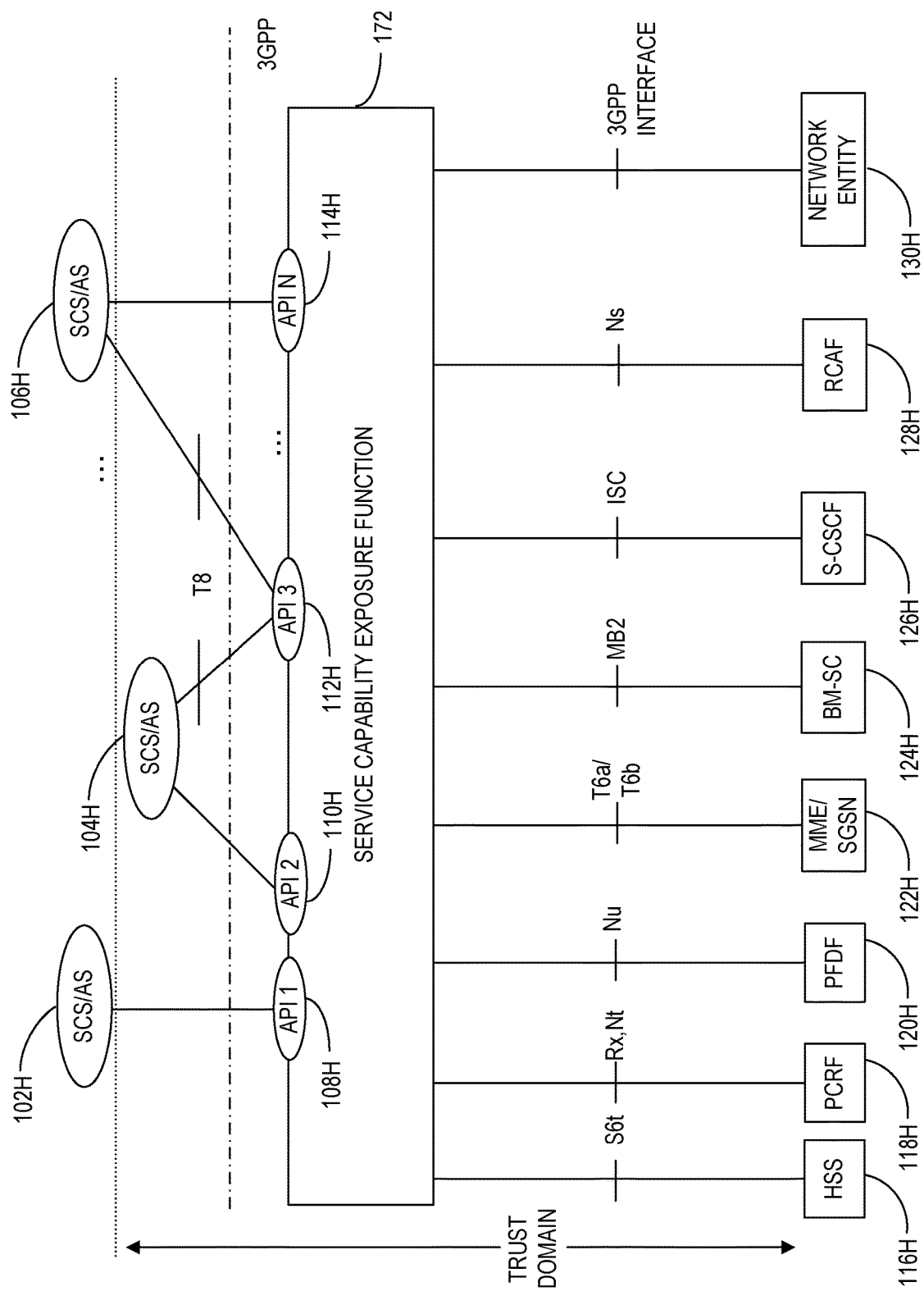
FIG. 1H illustrates an example Service Capability Exposure Function (SCEF) in accordance with some aspects.

FIG. 1H illustrates an example Service Capability Exposure Function (SCEF) in accordance with some aspects. Referring to FIG. 1H, the SCEF 172 can be configured to expose services and capabilities provided by 3GPP network interfaces to external third party service provider servers hosting various applications. In some aspects, a 3GPP network such as the CIoT architecture 140G, can expose the following services and capabilities: a home subscriber server (HSS) 116H, a policy and charging rules function (PCRF) 118H, a packet flow description function (PFDF) 120H, a MME/SGSN 122H, a broadcast multicast service center (BM-SC) 124H, a serving call server control function (S-CSCF) 126H, a RAN congestion awareness function (RCAF) 128H, and one or more other network entities 130H. The above-mentioned services and capabilities of a 3GPP network can communicate with the SCEF 172 via one or more interfaces as illustrated in FIG. 1H.

The SCEF 172 can be configured to expose the 3GPP network services and capabilities to one or more applications running on one or more service capability server (SCS)/application server (AS), such as SCS/AS 102H, 104H, . . . , 106H. Each of the SCS/AG 102H-106H can communicate with the SCEF 172 via application programming interfaces (APIs) 108H, 110H, 112H, . . . , 114H, as seen in FIG. 1H.

Figure 1I:
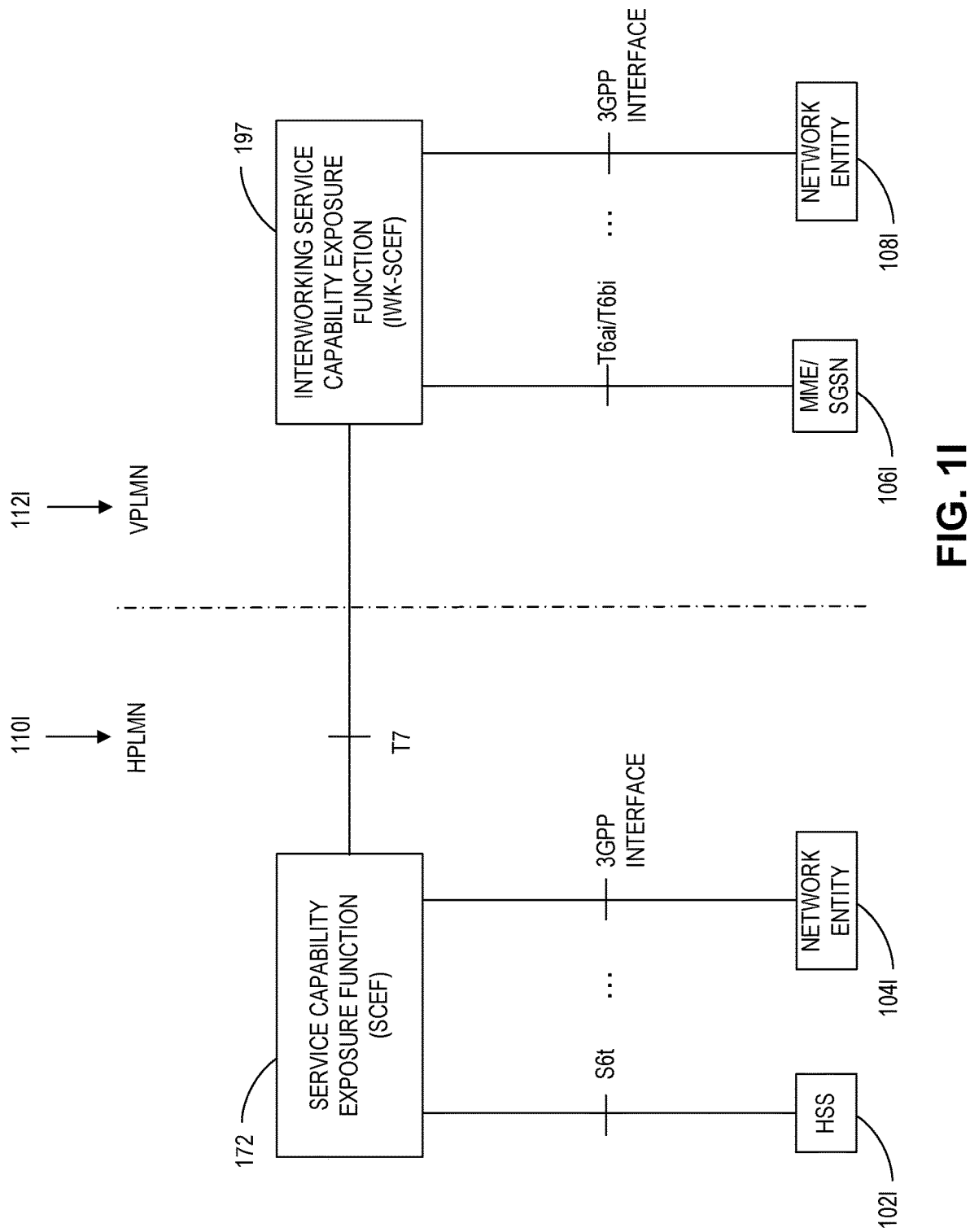
FIG. 1I illustrates an example roaming architecture for SCEF in accordance with some aspects.

FIG. 1I illustrates an example roaming architecture for SCEF in accordance with some aspects. Referring to FIG. 1I, the SCEF 172 can be located in HPLMN 110I and can be configured to expose 3GPP network services and capabilities, such as 102I, . . . , 104I. In some aspects, 3GPP network services and capabilities, such as 106I, . . . , 108I, can be located within VPLMN 112I. In this case, the 3GPP network services and capabilities within the VPLMN 112I can be exposed to the SCEF 172 via an interworking SCEF (IWK-SCEF) 197 within the VPLMN 112I.

Figure 2:
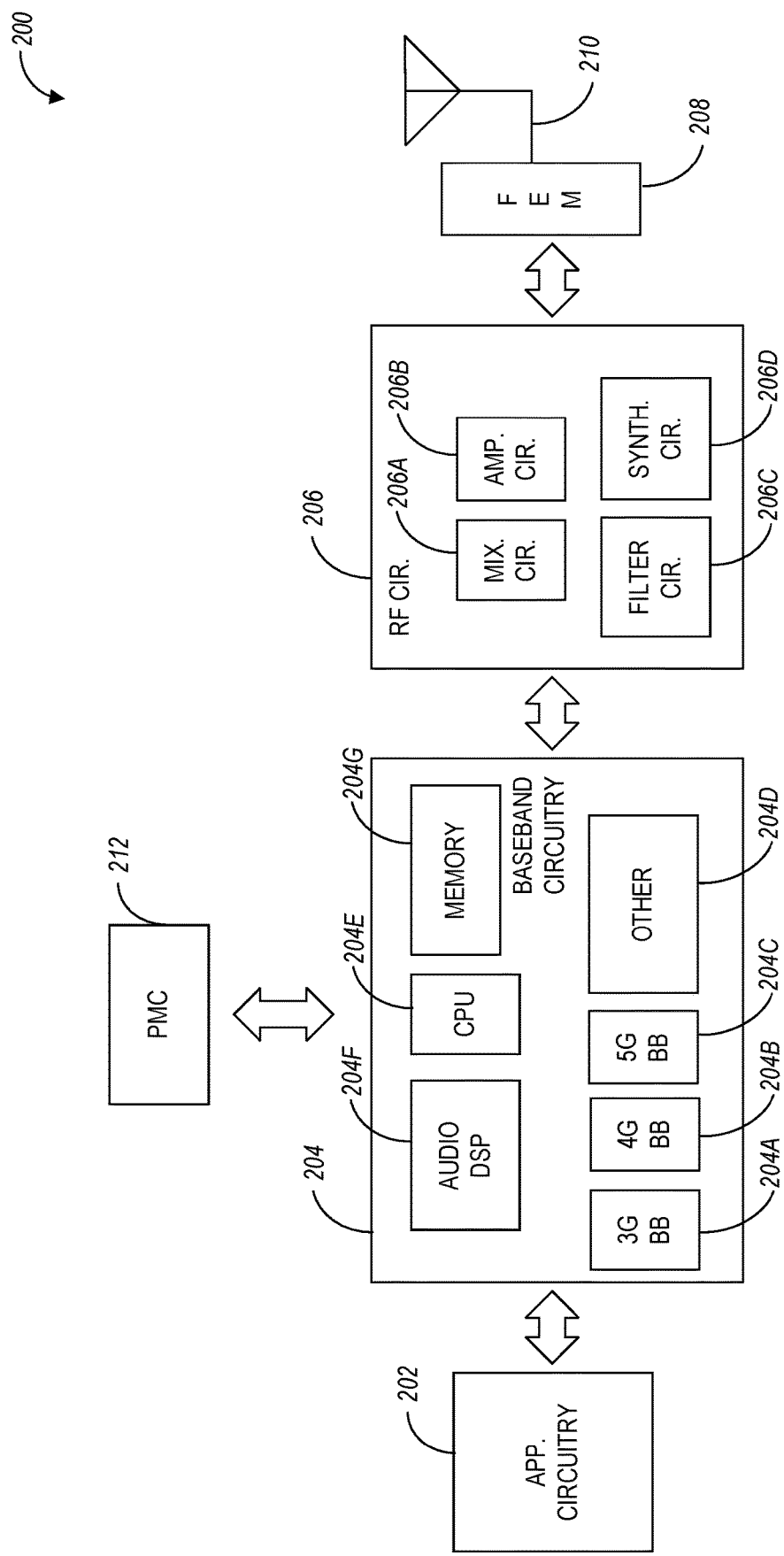
FIG. 2 illustrates example components of a device 200 in accordance with some aspects.

FIG. 2 illustrates example components of a device 200 in accordance with some aspects. In some aspects, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some aspects, the device 200 may include fewer elements (e.g., a RAN node may not utilize application circuitry 202, and instead include a processor/controller to process IP data received from an EPC). In some aspects, the device 200 may include additional elements such as, for example, memory/storage, display, camera, sensor, and/or input/output (I/O) interface elements. In other aspects, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors, special-purpose processors, and dedicated processors (e.g., graphics processors, application processors, etc.). The processors may be coupled with, and/or may include, memory/storage and may be configured to execute instructions stored in the memory/storage to enable various applications or operating systems to run on the device 200. In some aspects, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some aspects, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other aspects, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some aspects, modulation/demodulation circuitry of the baseband circuitry 204 may include Fast-Fourier Transform (FFT), precoding, or constellation mapping/de-mapping functionality. In some aspects, encoding/decoding circuitry of the baseband circuitry 204 may include convolution, tail-biting convolution, turbo, Viterbi, or Low-Density Parity Check (LDPC) encoder/decoder functionality. Aspects of modulation/demodulation and encoder/decoder functionality are not limited to these examples and may include other suitable functionality in other aspects.

In some aspects, the baseband circuitry 204 may include one or more audio digital signal processor(s) (DSP) 204F. The audio DSP(s) 204F may be include elements for compression/decompression and echo cancellation and may include other suitable processing elements in other aspects. Components of the baseband circuitry 204 may be suitably combined in a single chip, a single chipset, or disposed on a same circuit board in some aspects. In some aspects, some or all of the constituent components of the baseband circuitry 204 and the application circuitry 202 may be implemented together such as, for example, on a system on a chip (SOC).

In some aspects, the baseband circuitry 204 may provide for communication compatible with one or more radio technologies. For example, in some aspects, the baseband circuitry 204 may support communication with an evolved universal terrestrial radio access network (EUTRAN) or other wireless metropolitan area networks (WMAN), a wireless local area network (WLAN), and/or a wireless personal area network (WPAN). Baseband circuitry 204 configured to support radio communications of more than one wireless protocol may be referred to as multi-mode baseband circuitry, in some aspects.

RF circuitry 206 may enable communication with wireless networks using modulated electromagnetic radiation through a non-solid medium. In various aspects, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some aspects, the receive signal path of the RF circuitry 206 may include a mixer 206A, an amplifier 206B, and a filter 206C. In some aspects, the transmit signal path of the RF circuitry 206 may include a filter 206C and a mixer 206A. RF circuitry 206 may also include a synthesizer 206D for synthesizing a frequency for use by the mixer 206A of the receive signal path and the transmit signal path. In some aspects, the mixer 206A of the receive signal path may be configured to down-convert RF signals received from the FEM circuitry 208 based on the synthesized frequency provided by synthesizer 206D. The amplifier 206B may be configured to amplify the down-converted signals and the filter 206C may be a low-pass filter (LPF) or band-pass filter (BPF) configured to remove unwanted signals from the down-converted signals to generate output baseband signals. Output baseband signals may be provided to the baseband circuitry 204 for further processing. In some aspects, the output baseband signals may optionally be zero-frequency baseband signals. In some aspects, mixer 206A of the receive signal path may comprise passive mixers.

In some aspects, the mixer 206A of the transmit signal path may be configured to up-convert input baseband signals based on the synthesized frequency provided by the synthesizer 206D to generate RF output signals for the FEM circuitry 208. The baseband signals may be provided by the baseband circuitry 204 and may be filtered by filter 206C.

In some aspects, the mixer 206A of the receive signal path and the mixer 206A of the transmit signal path may include two or more mixers and may be arranged for quadrature down conversion and up conversion, respectively. In some aspects, the mixer 206A of the receive signal path and the mixer 206A of the transmit signal path may include two or more mixers and may be arranged for image rejection (e.g., Hartley image rejection). In some aspects, the mixer 206A of the receive signal path and the mixer 206A may be arranged for direct down conversion and direct up conversion, respectively. In some aspects, the mixer 206A of the receive signal path and the mixer 206A of the transmit signal path may be configured for super-heterodyne operation.

In some aspects, the output baseband signals and the input baseband signals may optionally be analog baseband signals. According to some alternate aspects, the output baseband signals and the input baseband signals may be digital baseband signals. In these alternate aspects, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode aspects, a separate radio IC circuitry may optionally be provided for processing signals for each spectrum.

In some aspects, the synthesizer 206D may optionally be a fractional-N synthesizer or a fractional N/N+1 synthesizer, although other types of frequency synthesizers may be suitable. For example, the synthesizer 206D may be a delta-sigma synthesizer, a frequency multiplier, or a synthesizer comprising a phase-locked loop with a frequency divider.

The synthesizer 206D may be configured to synthesize an output frequency for use by the mixer 206A of the RF circuitry 206 based on a frequency input and a divider control input. In some aspects, the synthesizer 206D may be a fractional N/N+1 synthesizer.

In some aspects, frequency input may be provided by a voltage controlled oscillator (VCO), although that is not a requirement. Divider control input may be provided, for example, by either the baseband circuitry 204 or the applications circuitry 202 depending on the desired output frequency. In some aspects, a divider control input (e.g., N) may be determined from a look-up table based on a channel indicated by the applications circuitry 202.

Synthesizer circuitry 206D of the RF circuitry 206 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some example aspects, the DLL may include a set of cascaded, tunable, delay elements, a phase detector, a charge pump and a D-type flip-flop. In these aspects, the delay elements may be configured to break a VCO period up into Nd equal packets of phase, where Nd is the number of delay elements in the delay line. In this way, the DLL provides negative feedback to assist in keeping the total delay through the delay line to one VCO cycle.

In some aspects, synthesizer circuitry 206D may be configured to generate a carrier frequency as the output frequency, while in other aspects, the output frequency may be a multiple of the carrier frequency (e.g., twice the carrier frequency, or four times the carrier frequency) and may be used in conjunction with quadrature generator and divider circuitry to generate multiple signals at the carrier frequency with multiple different phases with respect to each other. In some aspects, the output frequency may be a LO frequency (fLO). In some aspects, the RF circuitry 206 may include an IQ/polar converter.

FEM circuitry 208 may include a receive signal path which may include circuitry configured to operate on RF signals received from one or more antennas 210, and/or to amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various aspects, the amplification through the transmit signal paths or the receive signal paths may be done in part or solely in the RF circuitry 206, in part or solely in the FEM circuitry 208, or in both the RF circuitry 206 and the FEM circuitry 208.

In some aspects, the FEM circuitry 208 may include a TX/RX switch to switch between transmit mode and receive mode operation. The FEM circuitry 208 may include a receive signal path and a transmit signal path. The receive signal path of the FEM circuitry 208 may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 may manage power provided to the baseband circuitry 204. The PMC 212 may control power-source selection, voltage scaling, battery charging, and/or DC-to-DC conversion. The PMC 212 may, in some aspects, be included when the device 200 is capable of being powered by a battery, for example, when the device is included in a UE. The PMC 212 may increase the power conversion efficiency while providing beneficial implementation size and heat dissipation characteristics.

FIG. 2 shows the PMC 212 coupled with the baseband circuitry 204. In other aspects, the PMC 212 may be additionally or alternatively coupled with, and perform similar power management operations for, other components such as, but not limited to, application circuitry 202, RF circuitry 206, or FEM circuitry 208.

In some aspects, the PMC 212 may control, or otherwise be part of, various power saving mechanisms of the device 200. For example, if the device 200 is in an RRC_Connected state, in which it is still connected to the RAN node as it expects to receive traffic shortly, then it may enter a state known as Discontinuous Reception Mode (DRX) after a period of inactivity. During this state, the device 200 may power down for brief intervals of time and thus save power.

According to some aspects, if there is no data traffic activity for an extended period of time, then the device 200 may transition off to an RRC_Idle state, in which it disconnects from the network and does not perform operations such as channel quality feedback, handover, etc. The device 200 goes into a very low power state and it performs paging during which it periodically wakes up to listen to the network and then powers down again. The device 200 may transition back to RRC_Connected state to receive data.

An additional power saving mode may allow a device to be unavailable to the network for periods longer than a paging interval (ranging from seconds to a few hours). During this time, the device 200 in some aspects may be unreachable to the network and may power down. Any data sent during this time incurs a delay, which may be large, and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
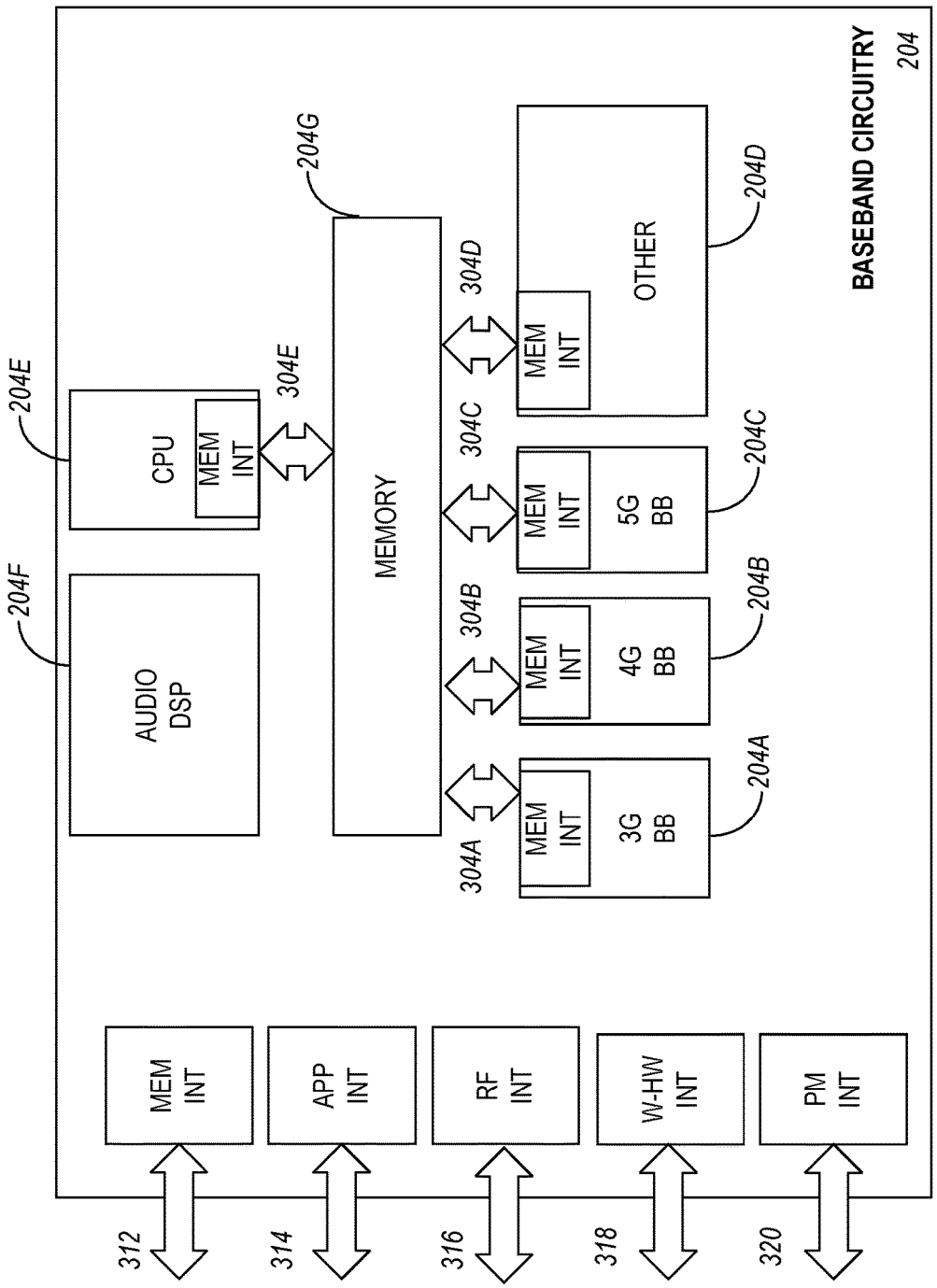
FIG. 3 illustrates example interfaces of baseband circuitry in accordance with some aspects.

FIG. 3 illustrates example interfaces of baseband circuitry 204, in accordance with some aspects. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
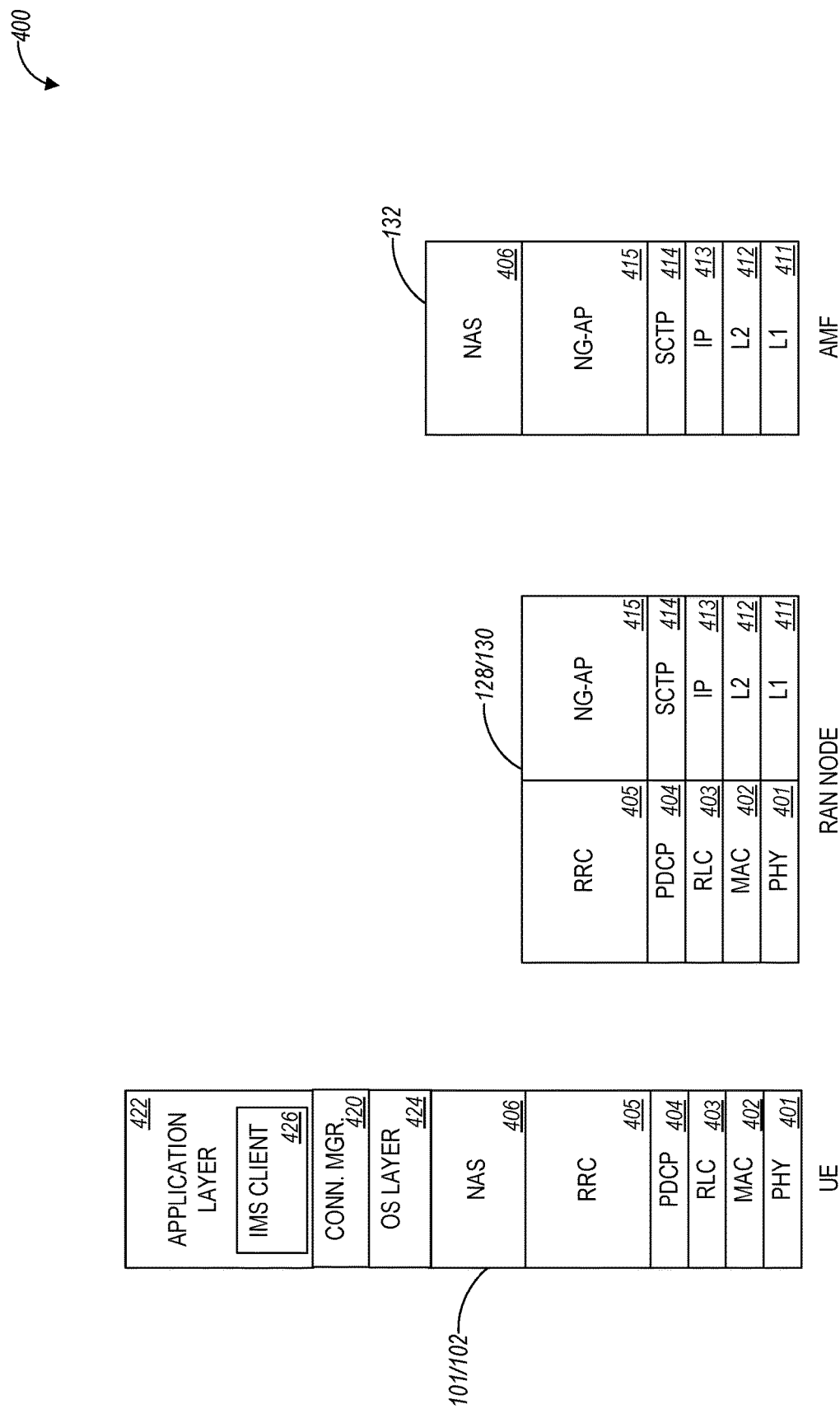
FIG. 4 is an illustration of a control plane protocol stack in accordance with some aspects.

FIG. 4 is an illustration of a control plane protocol stack in accordance with some aspects. In one aspect, a control plane 400 is shown as a communications protocol stack between the UE 102, the RAN node 128 (or alternatively, the RAN node 130), and the AMF 132.

The PHY layer 401 may in some aspects transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may in some aspects still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may in some aspects perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

The RLC layer 403 may in some aspects operate in a plurality of modes of operation, including: Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and segmentation and reassembly of RLC SDUs for UM and AM data transfers. The RLC layer 403 may also maintain sequence numbers independent of the ones in PDCP for UM and AM data transfers. The RLC layer 403 may also in some aspects execute re-segmentation of RLC data PDUs for AM data transfers, detect duplicate data for AM data transfers, discard RLC SDUs for UM and AM data transfers, detect protocol errors for AM data transfers, and perform RLC re-establishment.

The PDCP layer 404 may in some aspects execute header compression and decompression of IP data, maintain PDCP Sequence Numbers (SNs), perform in-sequence delivery of upper layer PDUs at re-establishment of lower layers, perform reordering and eliminate duplicates of lower layer SDUs, execute PDCP PDU routing for the case of split bearers, execute retransmission of lower layer SDUs, cipher and decipher control plane and user plane data, perform integrity protection and integrity verification of control plane and user plane data, control timer-based discard of data, and perform security operations (e.g., ciphering, deciphering, integrity protection, integrity verification, etc.).

In some aspects, primary services and functions of the RRC layer 405 may include broadcast of system information (e.g., included in Master Information Blocks (MIBs) or System Information Blocks (SIBs) related to the non-access stratum (NAS)); broadcast of system information related to the access stratum (AS); paging initiated by 5GC 120 or NG-RAN 110, establishment, maintenance, and release of an RRC connection between the UE and NG-RAN (e.g., RRC connection paging, RRC connection establishment, RRC connection addition, RRC connection modification, and RRC connection release, also for carrier aggregation and Dual Connectivity in NR or between E-UTRA and NR); establishment, configuration, maintenance, and release of Signalling Radio Bearers (SRBs) and Data Radio Bearers (DRBs); security functions including key management, mobility functions including handover and context transfer, UE cell selection and reselection and control of cell selection and reselection, and inter-radio access technology (RAT) mobility; and measurement configuration for UE measurement reporting. Said MIBs and SIBs may comprise one or more information elements (IEs), which may each comprise individual data fields or data structures. The RRC layer 405 may also, in some aspects, execute QoS management functions, detection of and recovery from radio link failure, and NAS message transfer between the NAS 406 in the UE and the NAS 406 in the AMF 132.

In some aspects, the following NAS messages can be communicated during the corresponding NAS procedure, as illustrated in Table 1 below:

TABLE 1

| 5G NAS Message | 5G NAS Procedure | 4G NAS Message name | 4G NAS Procedure |
| --- | --- | --- | --- |
| Registration Request | Initial registration procedure | Attach Request | Attach procedure |
| Registration Request | Mobility registration update procedure | Tracking Area Update (TAU) Request | Tracking area updating procedure |
| Registration Request | Periodic registration update procedure | TAU Request | Periodic tracking area updating procedure |
| Deregistration Request | Deregistration procedure | Detach Request | Detach procedure |
| Service Request | Service request procedure | Service Request or Extended Service Request | Service request procedure |
| PDU Session Establishment Request | PDU session establishment procedure | PDN Connectivity Request | PDN connectivity procedure |

In some aspects, when the same message is used for more than one procedure, then a parameter can be used (e.g., registration type or TAU type) which indicates the specific purpose of the procedure, e.g. registration type="initial registration", "mobility registration update" or "periodic registration update".

The UE 101 and the RAN node 128/130 may utilize an NG radio interface (e.g., an LTE-Uu interface or an NR radio interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the AMF 132 as illustrated in FIG. 4. In aspects, the NAS protocols 406 support the mobility of the UE 101 and the session management procedures to establish and maintain IP connectivity between the UE 101 and the UPF 134. In some aspects, the UE protocol stack can include one or more upper layers, above the NAS layer 406. For example, the upper layers can include an operating system layer 424, a connection manager 420, and application layer 422. In some aspects, the application layer 422 can include one or more clients which can be used to perform various application functionalities, including providing an interface for and communicating with one or more outside networks. In some aspects, the application layer 422 can include an IP multimedia subsystem (IMS) client 426.

The NG Application Protocol (NG-AP) layer 415 may support the functions of the N2 and N3 interface and comprise Elementary Procedures (EPs). An EP is a unit of interaction between the RAN node 128/130 and the 5GC 120. In certain aspects, the NG-AP layer 415 services may comprise two groups: UE-associated services and non UE-associated services. These services perform functions including, but not limited to: UE context management, PDU session management and management of corresponding NG-RAN resources (e.g. Data Radio Bearers [DRBs]), UE capability indication, mobility, NAS signaling transport, and configuration transfer (e.g. for the transfer of SON information).

The Stream Control Transmission Protocol (SCTP) layer (which may alternatively be referred to as the SCTP/IP layer) 414 may ensure reliable delivery of signaling messages between the RAN node 128/130 and the AMF 132 based, in part, on the IP protocol, supported by the IP layer 413. The L2 layer 412 and the L1 layer 411 may refer to communication links (e.g., wired or wireless) used by the RAN node 128/130 and the AMF 132 to exchange information.

The RAN node 128/130 and the AMF 132 may utilize an N2 interface to exchange control plane data via a protocol stack comprising the L1 layer 411, the L2 layer 412, the IP layer 413, the SCTP layer 414, and the S1-AP layer 415.

Figure 5:
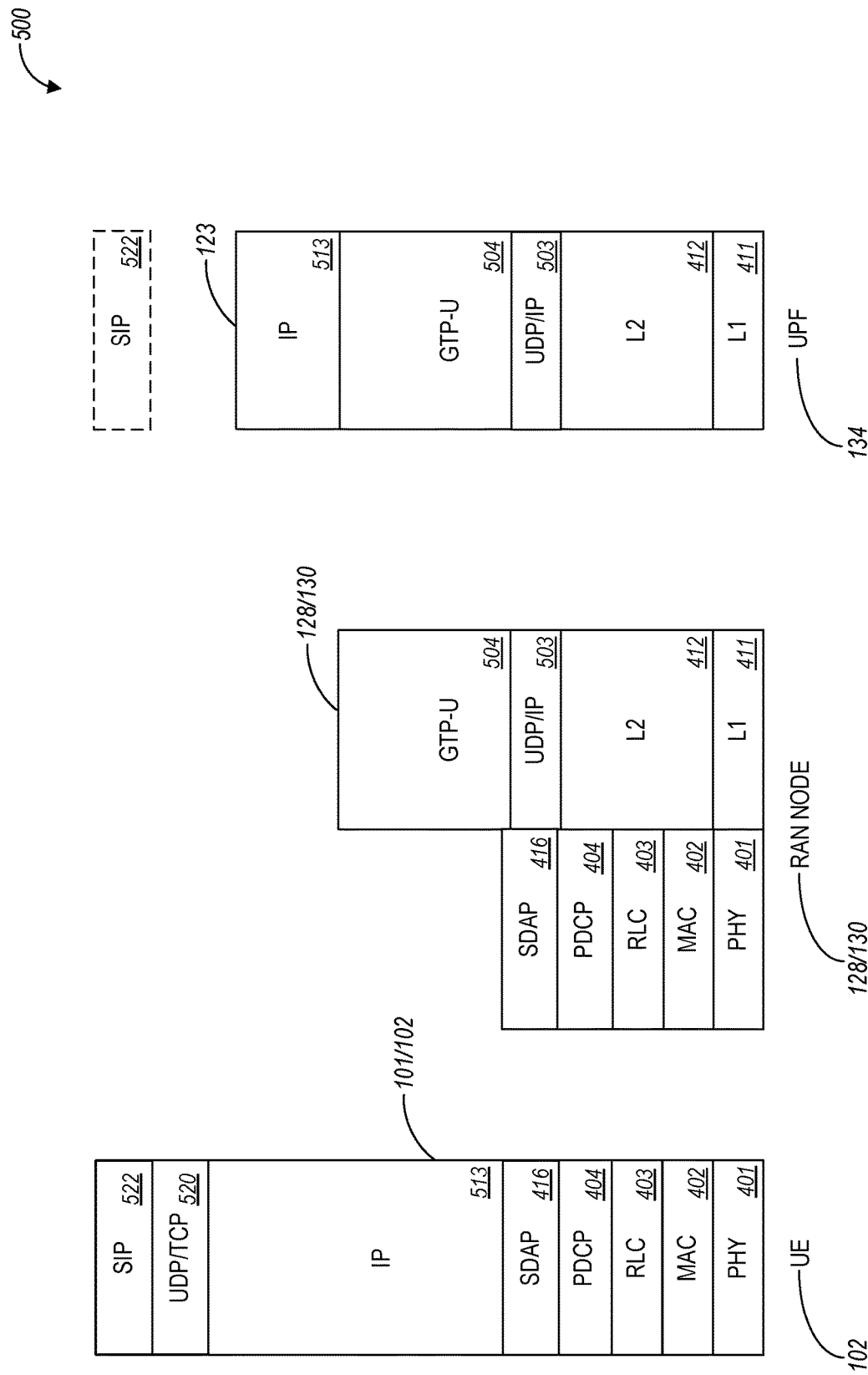
FIG. 5 is an illustration of a user plane protocol stack in accordance with some aspects.

FIG. 5 is an illustration of a user plane protocol stack in accordance with some aspects. In this aspect, a user plane 500 is shown as a communications protocol stack between the UE 102, the RAN node 128 (or alternatively, the RAN node 130), and the UPF 134. The user plane 500 may utilize at least some of the same protocol layers as the control plane 400. For example, the UE 102 and the RAN node 128 may utilize an NR radio interface to exchange user plane data via a protocol stack comprising the PHY layer 401, the MAC layer 402, the RLC layer 403, the PDCP layer 404, and the Service Data Adaptation Protocol (SDAP) layer 416. The SDAP layer 416 may, in some aspects, execute a mapping between a Quality of Service (QoS) flow and a data radio bearer (DRB) and a marking of both DL and UL packets with a QoS flow ID (QFI). In some aspects, an IP protocol stack 513 can be located above the SDAP 416. A user datagram protocol (UDP)/transmission control protocol (TCP) stack 520 can be located above the IP stack 513. A session initiation protocol (SIP) stack 522 can be located above the UDP/TCP stack 520, and can be used by the UE 102 and the UPF 134.

The General Packet Radio Service (GPRS) Tunneling Protocol for the user plane (GTP-U) layer 504 may be used for carrying user data within the 5G core network 120 and between the radio access network 110 and the 5G core network 120. The user data transported can be packets in IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 128/130 and the UPF 134 may utilize an N3 interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the UPF 134.

Figure 6:
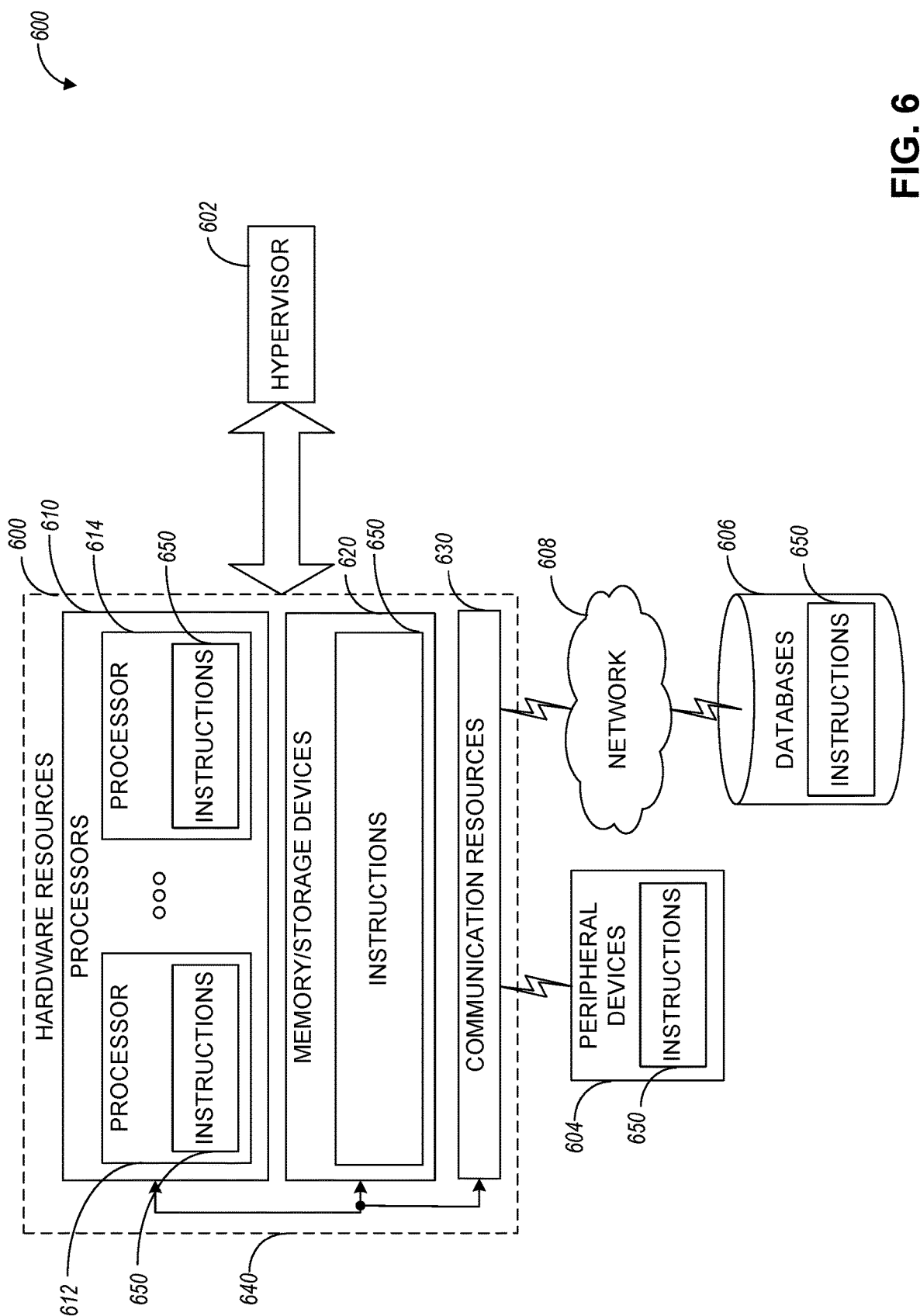
FIG. 6 is a block diagram illustrating components, according to some example aspects, able to read instructions from a machine-readable or computer-readable medium (e.g., a non-transitory machine-readable storage medium) and perform any one or more of the methodologies discussed herein.

FIG. 6 is a block diagram illustrating components, according to some example aspects, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For aspects in which node virtualization (e.g., NFV) is utilized, a hypervisor 602 may be executed to provide an execution environment for one or more network slices and/or sub-slices to utilize the hardware resources 600

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include main memory, disk storage, or any suitable combination thereof. The memory/storage devices 620 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Figure 7:
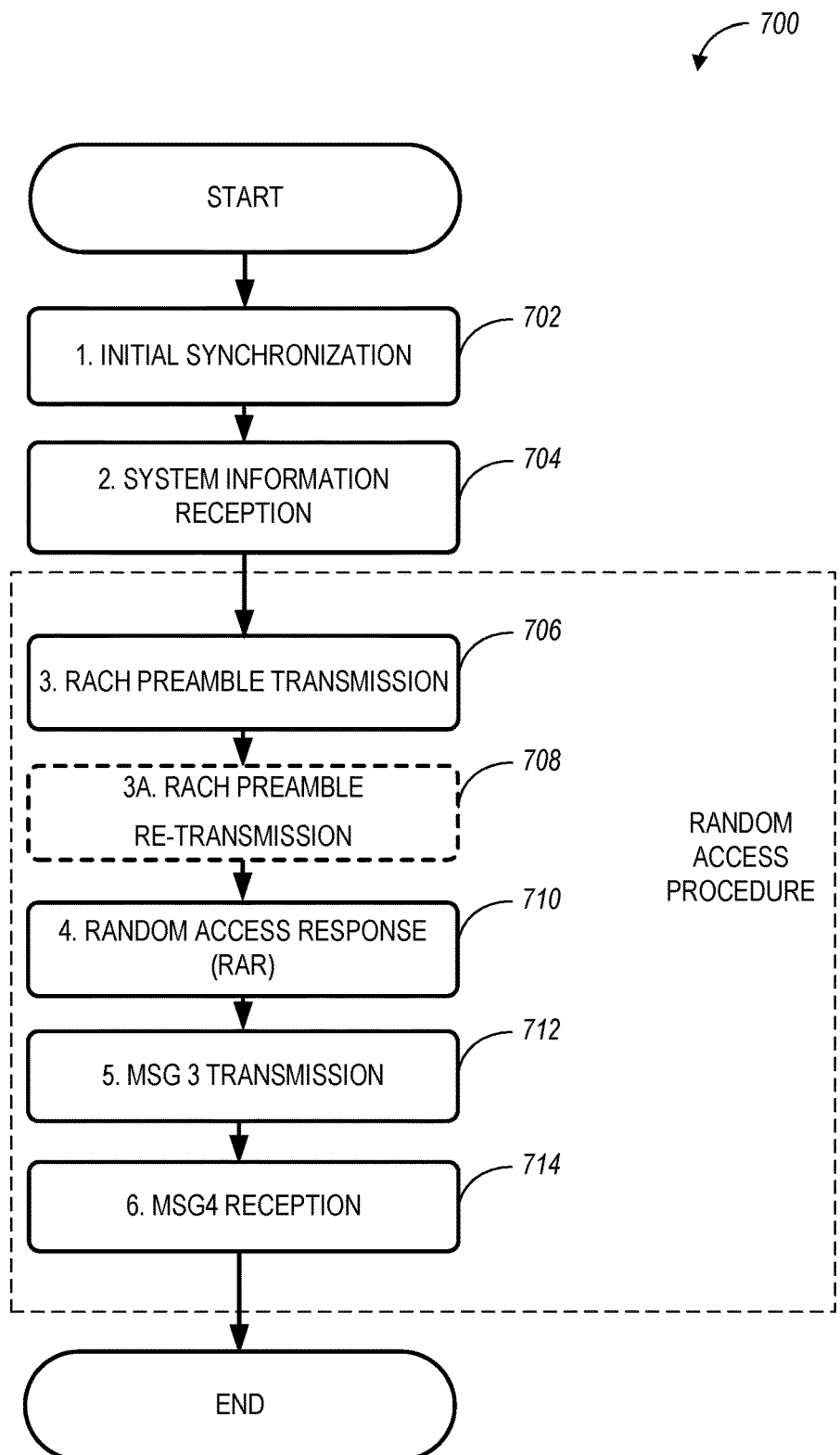
FIG. 7 is an illustration of an initial access procedure including PRACH preamble retransmission in accordance with some aspects.

FIG. 7 is an illustration of an initial access procedure 700 including PRACH preamble retransmission in accordance with some aspects. Referring to FIG. 7, the initial access procedure 700 can start with operation 702, when initial synchronization can take place. For example, the UE 101 can receive a primary synchronization signal and a secondary synchronization signal to achieve the initial synchronization. In some aspects, the initial synchronization at operation 702 can be performed using one or more SS blocks received within an SS burst set. At operation 704, the UE 101 can receive system information, such as one or more system information blocks (SIBs) and/or master information blocks (MIBs).

At operation 706 through 714, a random access procedure can take place. More specifically, at operation 706, a PRACH preamble transmission can take place as message 1 (Msg1). At operation 710, UE 101 can receive a random access response (RAR) message, which can be random access procedure message 2 (Msg2). In Msg2, the node (e.g., gNB) 111 can respond with random access radio network temporary identifier (RA-RNTI), which can be calculated from the preamble resource (e.g., time and frequency allocation).

In some aspects, UE 101 can be configured to perform one or more retransmissions of the PRACH preamble at operation 708, when the RAR is not received or detected within a preconfigured or predefined time window. The PRACH preamble retransmission can take place with power ramping, as explained herein below, so that the transmission power is increased until the random-access response is received.

At operation 712, UE 101 can transmit a random access procedure message 3 (Msg3), which can include a radio resource control (RRC) connection request message. At operation 714, a random access procedure message 4 (Msg4) can be received by the UE 101, which can include an RRC connection setup message, carrying the cell radio network temporary identifier (CRNTI) used for subsequent communication between the UE 101 and the node 111.

In some aspects, the UE 101 can be configured to perform uplink (UL) beam switching during retransmissions of configuration data such as the PRACH preamble. In some aspects, in cases when the UE has multiple analog beams and beam correspondence between transmission and reception is not available, then the UE may need to either change the transmission beam for the retransmission of PRACH or increase the transmission power of the PRACH retransmission. In aspects when the UE changes the Tx beam, then its power ramping counter can remain unchanged (i.e., the UE uses the same or similar power for the PRACH transmission in comparison with the previous PRACH transmission). In aspects when the UE does not change the Tx beam, then its power ramping counter can increase (e.g., incremented by one), and the UE can be configured to increase power for the PRACH retransmission.

In aspects when the UE is configured for multi-beam operation, synchronization signals (SSs) from multiple antennas in base station can be received, where the base station can be configured to generate the SSs using beam sweeping. In aspects when the UE detects a synchronization signal from a certain beam, then there can be one PRACH resource associated with the beam of the detected synchronization signal. In this regard, the UE can be configured to use the PRACH resource for the transmission of the PRACH preamble. Depending on the beam of the detected synchronization signal, the UE may use different PRACH resources for different PRACH sequences.

Figure 8:
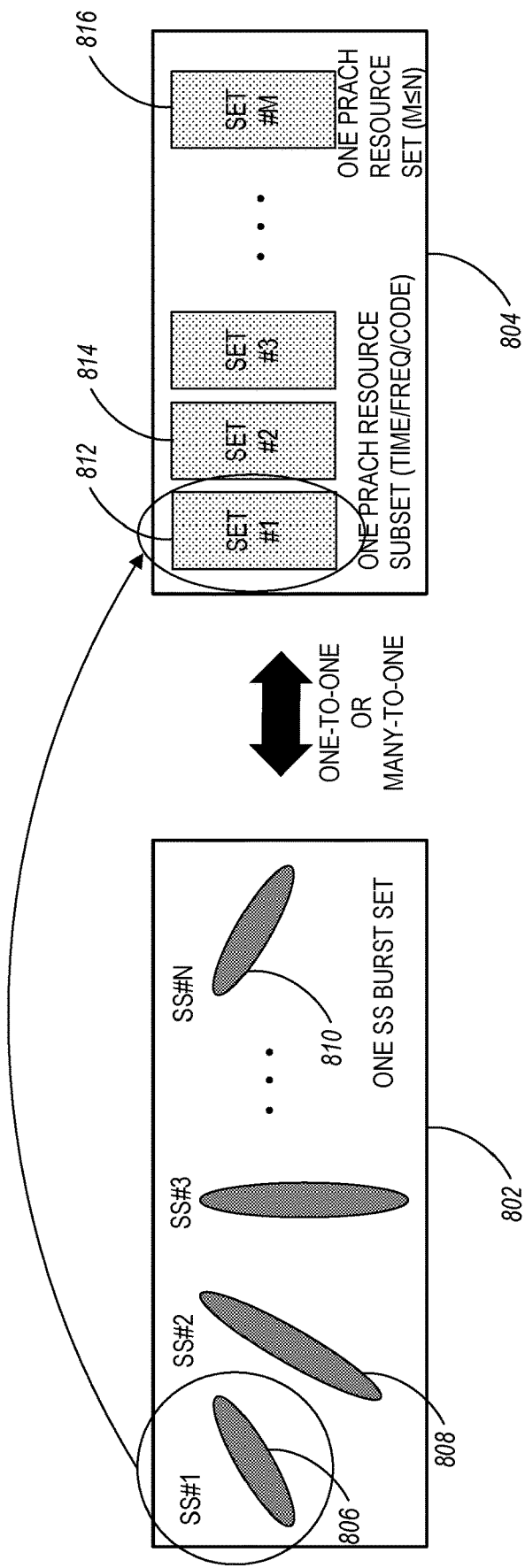
FIG. 8 is an illustration of PRACH resource configuration in accordance with some aspects.

FIG. 8 is an illustration of PRACH resource configuration in accordance with some aspects. In some aspects, the base station (e.g. gNB or node 111) can communicate a synchronization signal burst set 802, which can include multiple synchronization signals (or SS blocks) such as 806, 808, . . . , 810. The base station can use multiple synchronization signal blocks (SS blocks) for each downlink transmission beam. In some aspects, for each downlink transmission beam, there can be one PRACH resource subset configured by system information. For example, the UE 101 can be configured with a PRACH resource set 804, which can include PRACH resource subsets 812, 814, . . . , 816. Each of the PRACH resource subsets can include time and frequency information for communicating PRACH-related information such as the PRACH preamble. In some aspects, one-to-one or many-to-one correlation can exist between the synchronization signal blocks 806, . . . , 810 and the PRACH resource subsets 812, . . . , 816.

In some aspects, the downlink control information carried by a PDCCH can be monitored in one or more control resource sets (CORESETs). CORESETs denote time-frequency resources that are configured to a UE for monitoring for potential transmission of PDCCH carrying DL control information (DCI). In this regard, a CORESET can be defined as a set of resource element groups (REGs) with one or more symbol duration under a given numerology within which the UE 101 can attempt to (e.g., blindly) decode downlink control information (DCI). A UE is configured with PDCCH monitoring occasions and is expected to monitor for PDCCH in the CORESET associated with a particular PDCCH monitoring occasion configuration. In frequency domain, a CORESET can be contiguous or non-contiguous; while in time domain, a CORESET can be configured with one or a set of contiguous OFDM symbols. In addition, for large carrier bandwidth, maximum CORESET duration in time can be, e.g., 2 symbols while for narrow carrier bandwidth, maximum CORESET duration in time can be, e.g., 3 symbols. Additionally, either time-first or frequency-first REG-to-control channel element (CCE) mapping can be supported for NR PDCCH.

In some aspects, the physical antennas elements of a transmission-reception point (TRP), a gNB, and a UE can be grouped into antenna subarrays, where an antenna array may contain multiple subarrays. In some aspects, the physical antenna elements of the antenna sub-array can be virtualized to the antenna port(s) using analog beamforming. The analog beamforming may be used to improve the performance of the communication link between the TRP and the UE. The analog beamforming at the TRP and at the UE may be trained by transmitting a series of the reference signals with different beamforming. In some aspects, the UE may also train the receive beamforming. The optimal analog beamforming at the UE may be depend on the beamforming at the TRP and vice versa. In some aspects, each subarray may have different analog beamforming, which can be controlled by antenna weights.

In some aspects, multiple optimal Tx/Rx beam combinations at the TRP/gNB and the UE can be established for possible communication. An optimal Tx beam on one antenna subarray can be reused on another antenna subarray. The optimal Rx beam at the UE can be the same. The reference signals transmitted on antenna port with the same beam (using the same or different panels) are quasi co-located (or QCL-ed) with each other with regard to spatial channel parameters.

Figure 9:
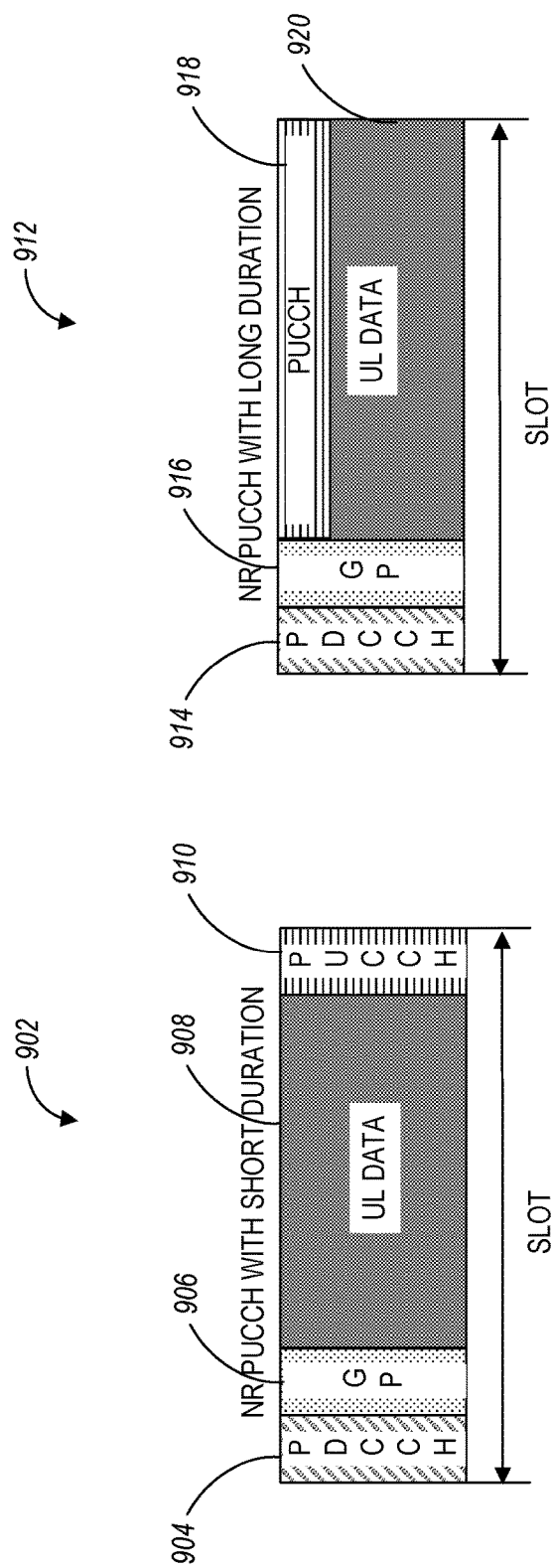
FIG. 9 is an illustration of NR PUCCH with short and long durations and an uplink data slot in accordance with some aspects.

FIG. 9 is an illustration of NR PUCCH with short and long durations and an uplink data slot in accordance with some aspects. Referring to FIG. 9, PUCCH with short duration is transmitted in slot 902, and PUCCH with long duration is transmitted in slot 912. For NR PUCCH with short duration in slot 902, NR PUCCH 910 and physical uplink shared channel (PUSCH) (or uplink data) 908 are multiplexed in a time division multiplexing (TDM) manner, which can be useful for low latency application.

For NR PUCCH 918 with long duration within a slot 912, multiple OFDM symbols can be allocated for NR PUCCH to improve link budget and uplink coverage for control channel communication. More specifically, for the uplink (UL) data slot portion, NR PUCCH 918 and PUSCH 920 can be multiplexed in a frequency division multiplexing (FDM) fashion. In some aspects and as seen in FIG. 9, in order to accommodate the downlink (DL) to UL and UL to DL switching time and round-trip propagation delay, a guard period (GP) (906 and 916) is inserted between NR physical downlink control channel (NR PDCCH 904 and 914) and NR PUSCH 908 or NR PUCCH 918 with long duration.

Figure 14:
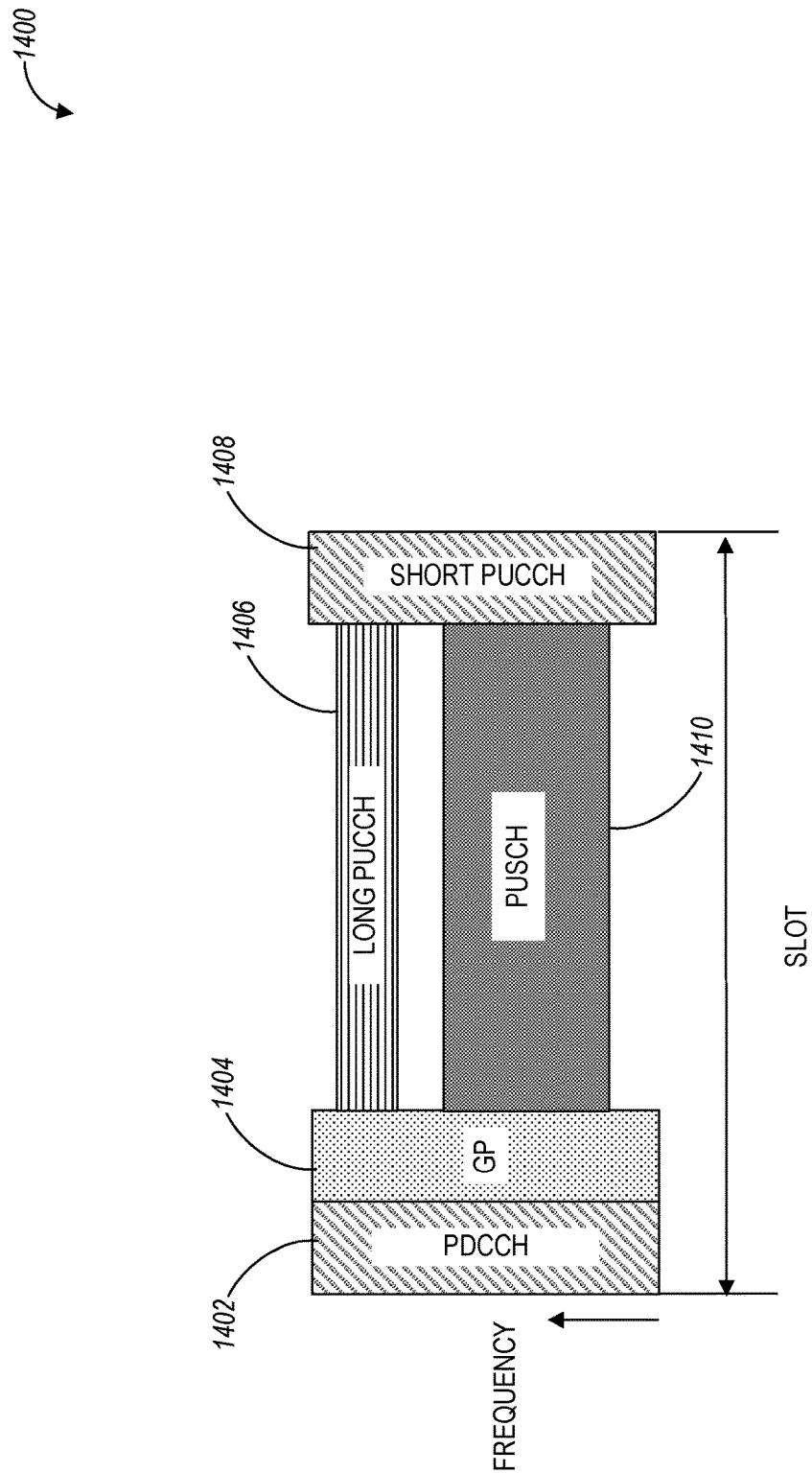
FIG. 14 is an illustration of an uplink control channel including long and short PUCCHs in accordance with some aspects.

In some aspects, short PUCCH 910 may span one or two symbol(s) while long PUCCH 918 may span any number of symbols, such as from 4 to 14 symbols within a slot. In some aspects associated with 5G-NR communications, for a given UE, short PUCCH 910 and long PUCCH 918 can be multiplexed in a TDM manner in the same slot (e.g., as seen in FIG. 14). For instance, long PUCCH 918 may be used to carry relatively large payload (e.g., channel state information (CSI) report), while short PUCCH 910 may be used to carry time sensitive information including hybrid automatic repeat request-acknowledgement (HARQ-ACK) information and scheduling request (SR) information as part of the uplink control information (UCI).

In some aspects, sequence-based approach can be used for NR PUCCH with short duration carrying up to 2 bits UCI payload. In particular, for this option, independent resources in the frequency or code domain can be assigned to carry HARQ-ACK feedback information, where independent resources correspond to different cyclic shifted versions of the same base sequence (e.g., a Zadoff-Chu sequence or computer generated sequences can be potential candidates for a base sequence), which are orthogonal in frequency (i.e., associated with zero cross-correlation). In this sequence selection based option, a receiving gNB can perform energy detection to differentiate HARQ-ACK or SR information within the received PUCCH, which leads to reduced receiver complexity.

Techniques disclosed herein associated with sequence design of NR PUCCH with short and long durations. More specifically, techniques disclosed herein below include mechanisms on multiplexing short and long PUCCHs carrying up to 2 bits UCI in a code division multiplexing (CDM) manner, sequence design for short PUCCH with 2 symbol duration carrying up to 2 bits UCI, and sequence design for short PUCCH with 1 symbol duration carrying up to 2 bits UCI (HARQ only, SR only and simultaneous HARQ and positive SR transmissions from single and multiple UE perspectives).

Multiplexing Short and Long PUCCHs Carrying Up to 2 Bits of UCI in a CDM Manner

Figure 10:
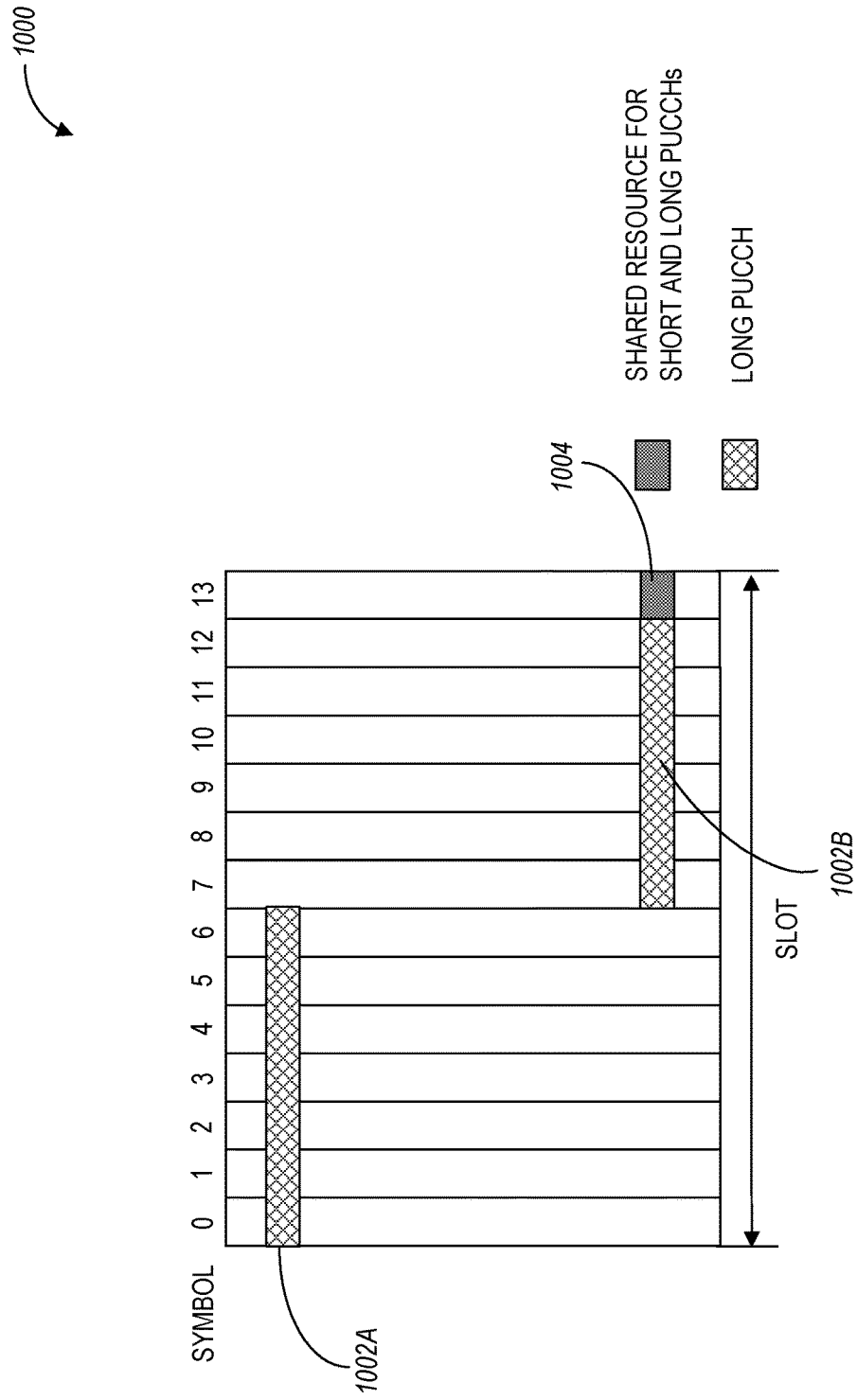
FIG. 10 is an illustration of code division multiplexing (CDM) of short and long PUCCHs where the short PUCCH is allocated in the last symbol of the slot in accordance with some aspects.

In some aspects, sequence-based structure can be in used for PUCCH with short duration carrying up to 2 bits of UCI payload, e.g., for 1 or 2 bit(s) HARQ-ACK feedback or SR information. In this case, short PUCCH and long PUCCH from the same or different UEs may be multiplexed in the same physical resource in a CDM manner, which can allow more efficient operation from system level perspective. FIG. 10 is an illustration of code division multiplexing (CDM) of short and long PUCCH where the short PUCCH is allocated in the last symbol of the slot in accordance with some aspects. Referring to FIG. 10, long PUCCH can be transmitted using frequency hopping within the slot 1000. More specifically, a first portion 1002A of long PUCCH can occupy symbols 0 through 6, and a second portion 1002B can be frequency hopped and transmitted at a different frequency from symbols 7 through 13. A short PUCCH 1004 can be code division multiplexed with the long PUCCH and transmitted in the same symbol, such as the last symbol of the long PUCCH transmission (i.e., symbol 13).

To enable CDM-based multiplexing of short PUCCH and long PUCCH carrying up to 2 bits UCI in the same physical resource, in one aspect of the disclosure, the same set of sequences can be used for the transmission of demodulation reference signal (DM-RS) and/or UCI for the long PUCCH and the short PUCCH. Additionally, part of sequences in the set of sequences can be allocated for the transmission of DM-RS and/or UCI for long PUCCH, while the remaining sequences can be allocated for the transmission of UCI for the short PUCCH, in aspects when the short PUCCH and long PUCCH are multiplexed in the CDM manner.

In some aspects, short PUCCH can be transmitted in the last one or two symbols within one slot that includes the long PUCCH transmission. Furthermore, for symbol-based data transmissions, e.g., for ultra-reliable low latency communications (URLLC), short PUCCH carrying 1 or 2 bits HARQ-ACK feedback or SR may be transmitted in the middle of one slot in order to meet stringent latency requirement. In this case, short PUCCH may be transmitted in any one or two symbols within one slot.

Figure 11:
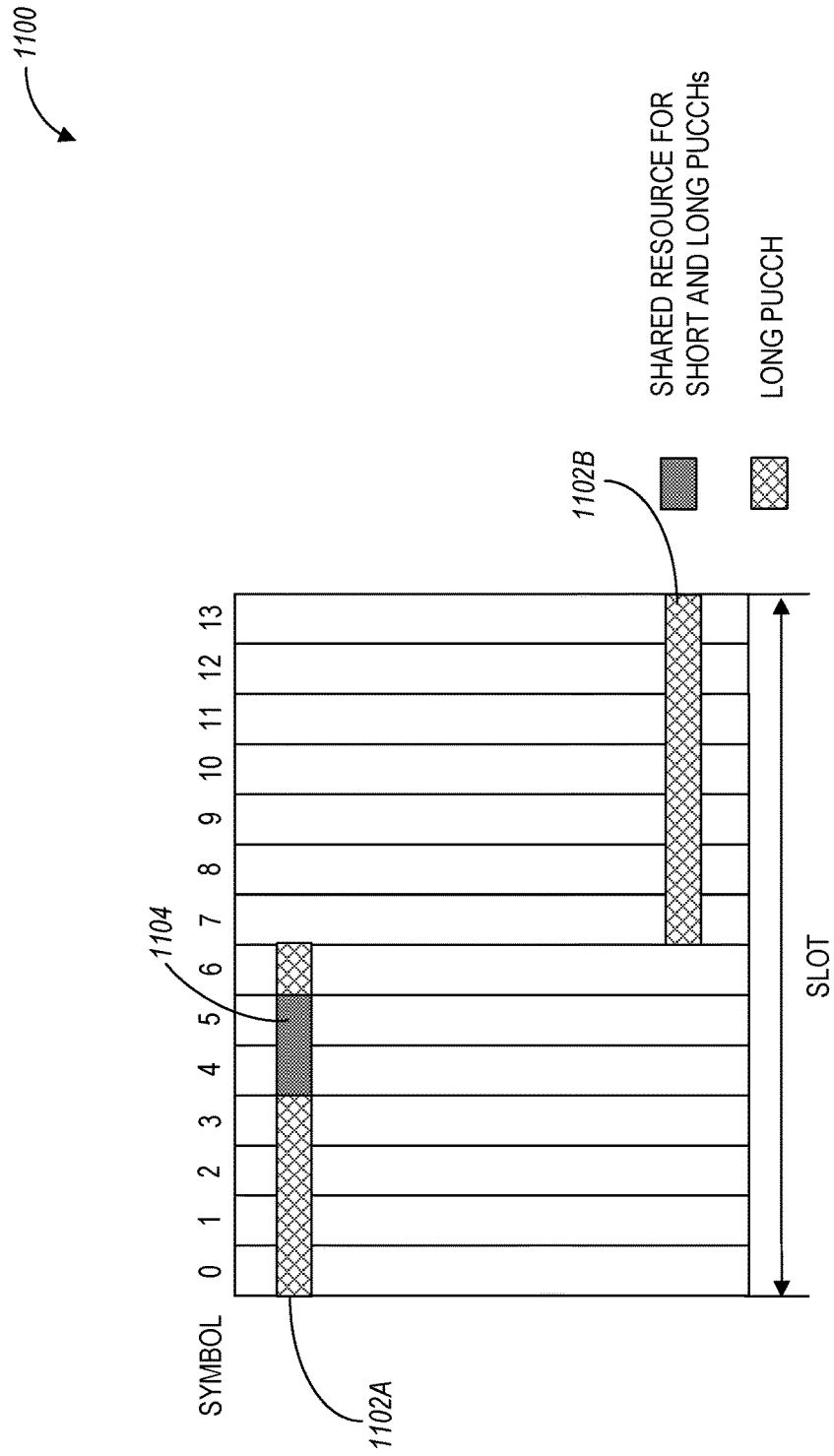
FIG. 11 is an illustration of code division multiplexing of short and long PUCCHs where the short PUCCH is allocated near the middle of the slot in accordance with some aspects.

FIG. 11 is an illustration of code division multiplexing of short and long PUCCHs where the short PUCCH is allocated in the middle of the slot in accordance with some aspects. Referring to FIG. 11, long PUCCH can be transmitted using frequency hopping within the slot 1100. More specifically, a first portion 1102A of long PUCCH can occupy symbols 0 through 6, and a second portion 1102B can be frequency hopped and transmitted at a different frequency from symbols 7 through 13 of slot 1100. A short PUCCH 1104 can be code division multiplexed with the long PUCCH and transmitted in the same symbol(s), such as symbols 4-5 of the long PUCCH transmission 1102A.

In some aspects, Zadoff-Chu or computer generated sequences can be used for the sequence of short and long PUCCHs. In order to multiplex short and long PUCCHs in a CDM manner, the same base sequence can be used for the transmission of short and long PUCCHs in the same slot. Furthermore, different cyclic shifts can be applied for the transmission of short and long PUCCHs in the same resource.

In some aspects associated with short and long PUCCH communication, sequence hopping can be employed in order to randomize the inter-cell interference. For short and long PUCCHs which are multiplexed in the CDM manner, the same sequence hopping pattern may be employed regardless of the starting and end positions of short and long PUCCHs. In this regard, in some aspects, a same cell-specific (sequence) hopping pattern can be applied for sequence hopping (e.g., for selecting a base sequence) for the transmission of short and long PUCCHs, where the cell specific hopping may vary on a symbol and/or slot basis in order to randomize the inter-cell interference. Additionally, the cell-specific hopping pattern for base sequence selection can be communicated to the UE via higher layer signaling or other type of configuration information signaling.

In aspects when Zadoff-Chu or computer-generated sequences are used for the base sequence of short and long PUCCHs, cyclic shift hopping (e.g., using a cyclic shift hopping sequence) can be employed. The cyclic shift hopping sequence can be communicated via higher layer signaling and can be defined as a function of one or more of the following parameters: physical or virtual cell ID, symbol index, sub-slot index and slot index. In some aspects, sub-slot index may be used in case when one slot with 14 symbol duration is further divided into two sub-slots, where each sub-slot has 7 symbols.

In some aspects, slot index may be used for long PUCCH with or without frequency hopping. More specifically, for frequency hopping, the switching point may be located in the middle of the long PUCCH transmission duration, rather than in the middle of the slot duration. Given that switching points may not be aligned between different UEs, a single slot index may be applied for the generation of cell specific cyclic shift value.

In some aspects, a cell-specific cyclic shift hopping pattern in $n_s$ slot and $l^{th}$ symbol can be given by the following equation:

$$n_{PN}(n_s,l) = \Sigma_{i=0}^{13} c(c_0 N_{sym}^{UL} \cdot n_s + c_1 \cdot l + i) * 2^i,$$

where $c_0$ and $c_1$ are constants, which can be predefined in a wireless specification or configured by higher layers via multicast channel scheduling information (MSI), remaining minimum system information (RMSI), system information block (SIB) or radio resource control (RRC) signaling. $N_{sym}^{UL}$ is the number of symbols in a slot. For instance, $c_0 = c_1 = 16$. Function $c(\cdot)$ is the pseudo-random function, which can be defined in an NR specification. In some aspects, the above summation can be performed for i=0 to 6.

In some aspects, symbol and/or slot index may be defined in accordance with the reference numerology (e.g., 15 KHz for sub-6 GHz carrier frequency or 120 KHz for above 6 GHz carrier frequency) or numerology which is employed for the transmission of synchronization signal (SS) block or physical broadcast channel (PBCH) or RMSI. Alternatively, symbol and/or sub-slot index and/or slot index can be defined in accordance with the numerology which is configured within a bandwidth part (BWP).

In some aspects, when one slot duration (7 or 14 symbols) is configured in a UE-specific manner to multiplex long PUCCH for different slot durations in the same physical resource, cell-specific cyclic shift hopping pattern may be aligned between slot duration with 7 and 14 symbols. In one option, for long PUCCH with 7-symbol slot duration, the cell specific cyclic shift hopping pattern including symbol index can be generated in accordance with the slot duration of 14 symbols.

In some aspects, such as in LTE communication systems, UEs sharing the same cyclic shift (CS) pattern or the same orthogonal cover code (OCC) as the target UE would be shuffled in the next slot, with the intention to distribute near-far effects to other UEs which is caused by a strong hostile UE. For 5G-NR based communication systems, this CS and OCC reshuffling mechanism may be disabled to allow beam sweeping operation by using the same OCC within one slot. In one aspect, whether this CS and OCC reshuffling mechanism is enabled or disabled may be predefined in a 5G-NR specification or configured by higher layers via MSI, RMSI, SIB or RRC signalling. For instance, for carrier frequency above 6 GHz, the CS and OCC reshuffling mechanism can be disabled. In another aspect, in case when frequency hopping is applied for long PUCCH, the CS and OCC reshuffling mechanism can be enabled.

In some aspects, the cyclic shift value for the transmission of short and/or long PUCCH(s) can be determined based on a value which is configured by higher layers or dynamically indicated in the downlink control information (DCI) or a combination thereof, or a value which is calculated in accordance with the cyclic shift hopping pattern as mentioned above or any combination thereof.

Sequence Design for Short PUCCH with 2 Symbol Duration Carrying Up to 2 Bits of UCI In some aspects, sequence selection based approach can be adopted for short PUCCH carrying up to 2 bits of UCI payload. In addition, short PUCCH may span 1 or 2 symbol(s) within one slot. Additionally, cell-specific and/or UE-specific cyclic shift hopping pattern can be defined in order to randomize the inter-cell and/or intra-cell interference during PUCCH transmission.

In some aspects, a cyclic shift offset can be applied in different symbols for short PUCCH with 2 symbol duration. Furthermore, the cyclic shift offset may be predefined in a 5G-NR specification or configured by higher layers via MSI, RMSI, system information block (SIB) or RRC signaling. In aspects when the cyclic shift offset is configured by UE-specific RRC signaling, intra-cell interference randomization may be achieved for short PUCCH with 2-symbol duration.

In some aspects, the cyclic shift values for $(l-1)^{th}$ and $l^{th}$ symbols of the short duration PUCCH can be equations:

$$n_{CS}(l-1) = (n_{PUCCH}) \bmod(N_{SC}^{RB}) \text{ and } n_{CS}(l) = (n_{PUCCH} + \Delta CS) \bmod(N_{SC}^{RB}),$$

where $n_{CS}(l-1)$ and $n_{CS}(l)$ are the cyclic shift values for $(l-1)^{th}$ and $l^{th}$ symbols (may be second to last symbol or the last symbol), respectively. $n_{PUCCH}$ is the cyclic shift value which is configured by higher layers via UE specific RRC signaling or dynamically indicated in the DCI or a combination thereof. $\Delta_{CS}$ is the cyclic shift offset. $N_{SC}^{RB}$ is the number of subcarriers in one resource block, i.e., $N_{SC}^{RB} = 12$.

Figure 12:
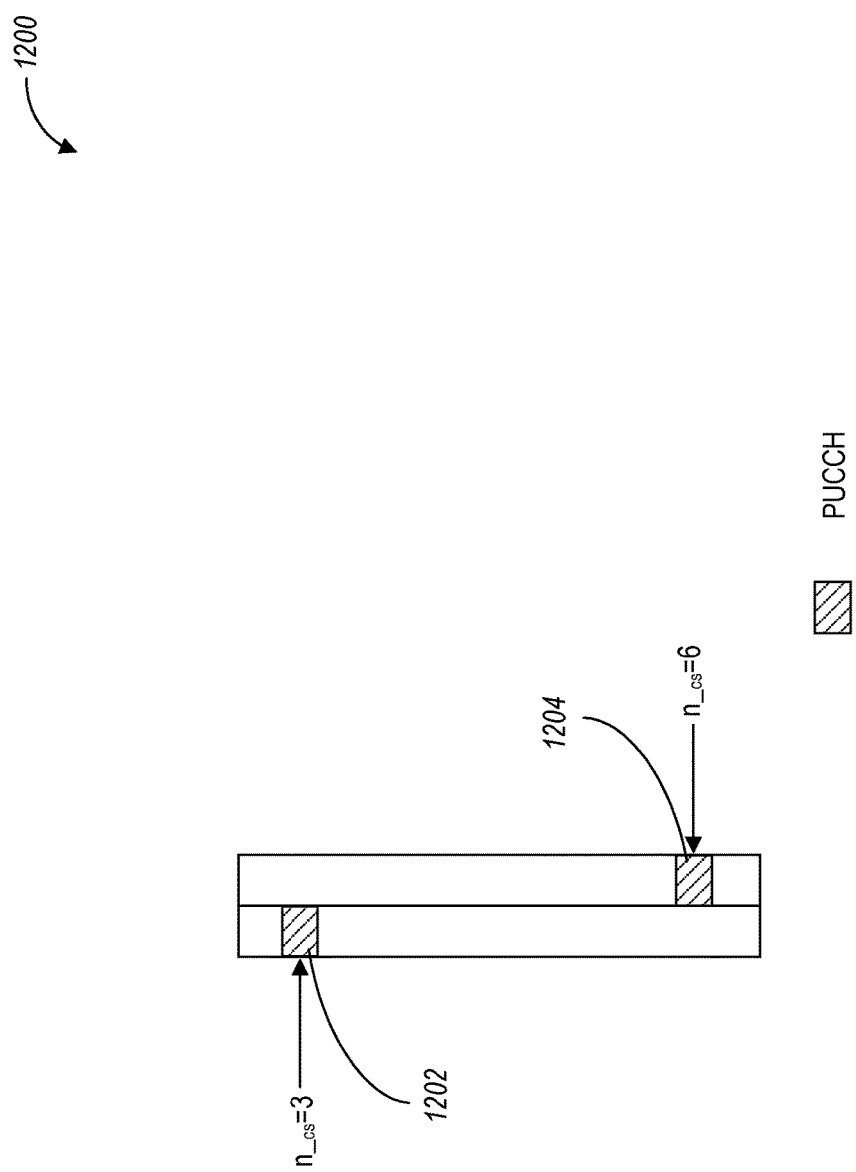
FIG. 12 is an illustration of cyclic shift hopping for short PUCCH with a 2-symbol duration in accordance with some aspects.

FIG. 12 is an illustration of cyclic shift hopping for short PUCCH with a 2-symbol duration in accordance with some aspects. Referring to FIG. 12, the short PUCCH 1200 can include PUCCH transmissions 1202 and 1204 in two frequency hopped symbols. As seen in FIG. 12, the first short duration PUCCH transmission 1202 can be based on a cyclic shift value of 3. Additionally, since the cyclic shift offset $\Delta_{CS}$ is 3, the cyclic shift value used for the second short PUCCH transmission 1204 can equal to 6.

In some aspects, a cell-specific hopping pattern can be applied for the sequence generation of short PUCCH with 2 symbol duration carrying up to 2 bits of UCI payload. As mentioned herein, this functionality may allow the multiplexing of short and long PUCCHs in a CDM manner.

In one example, the cyclic shift value for the $l^{th}$ symbol for a PUCCH transmission can be given by the following equation:

$$n_{CS}(l) = (n_{PUCCH} + n_{PN}(n_s,l)) \bmod(N_{SC}^{RB}),$$

where $n_{PN}(n_s,l)$ is the cell-specific cyclic shift hopping pattern for the $n_s$ slot and the $l^{th}$ symbol. As discussed herein, slot and symbol indices may be defined in accordance with the reference numerology or numerology which is employed for the transmission of SS block or RMSI, or the numerology which is configured within a bandwidth part.

In some aspects, a combination of cell-specific and UE-specific cyclic shift hopping patterns can be applied for the sequence generation of short PUCCH with 2 symbol duration carrying up to 2 bits UCI payload.

In one example, the cyclic shift values for the $(l-1)^{th}$ and $l^{th}$ symbols can be defined by the following equations:

$$n_{CS}(l-1) = (n_{PUCCH} + n_{PN}(n_s,l-1)) \bmod(N_{SC}^{RB}) \text{ and }$$
$$n_{CS}(l) = (n_{PUCCH} + n_{PN}(n_s,l-1) + \Delta_{CS}) \bmod(N_{SC}^{RB}).$$

As discussed herein, $\Delta_{CS}$ is the cyclic shift offset, which can be configured by UE-specific RRC signaling.

In some aspects, a cyclic shift hopping pattern can be predefined (e.g., in a 5G-NR specification) or defined as a function of one or more of the following parameters: physical cell ID, virtual cell ID, cyclic shift value configured by higher layer signaling (or indicated by DCI) or a combination thereof, symbol/slot/frame index, frequency resource index, and UE ID (e.g., cell radio network temporary identifier (C-RNTI)).

In some aspects, the cyclic shift values for the $(l-1)^{th}$ and the $l^{th}$ symbols in the PUCCH transmission can be defined by the following equations:

$$n_{CS}(l-1)=(n_{PUCCH}+n_{PN}(n_s,l-1))\mod(N_{SC}^{RB}) \text{ and}$$
$$n_{CS}(l)=(n_{PUCCH}+n_{PN}(n_s,l-1)+f(n_{RNTI}))\mod(N_{SC}^{RB}),$$

where $f(n_{RNTI})$ is defined as a function of C-RNTI. For instance, $f(n_{RNTI})=0$ or 1 depending on the C-RNTI.

Sequence Design for Short PUCCH with 1-Symbol Duration Carrying Up to 2 Bits of UCI In some aspects, sequence selection based approach can be adopted for 1-symbol short PUCCH carrying up to 2 bits of UCI payload (e.g., 1 or 2 bits of HARQ-ACK feedback and/or SR information). In addition, 1-symbol short PUCCH may span over multiple physical resource blocks (PRBs), where one PRB can include 12 frequency subcarriers in 5G-NR communications. Independent resources can be assigned in the frequency and/or code domain to carry HARQ-only, SR-only, or simultaneous HARQ and positive SR feedbacks using 1-symbol short PUCCH for a single UE or multiple UEs multiplexed within a slot, where independent resources may correspond to one of the following:

(a) Different cyclic shifted versions of the same base sequence (e.g., Zadoff-Chu or computer-generated sequences can be potential candidates for base sequence), which are orthogonal in frequency (i.e. zero cross-correlation) and mapped on the same PRB; and (b) The same sequence (i.e., base sequence as mentioned above) or set of sequences (different cyclic shifted versions of the base sequence) mapped on different PRBs.

In some aspects, frequency and code domain resources can be indicated via a single resource index, which is configured by higher layers via UE-specific RRC signaling or dynamically indicated in the DCI, or a combination thereof. Various combinations of frequency and code domain resources can be configured by higher layers for assigning $N_{PUCCH}$ number of independent resources within a slot for 1-symbol short PUCCH transmission.

In one aspect, the number of independent resources $N_{PUCCH}$ can be defined by the following equation: $N_{PUCCH}=N_f*N_c$, where, $N_f$ is the number of PRBs assigned for 1-symbol PUCCH, and $N_c$ is the number of cyclic shift values of the base sequence (i.e., the number of orthogonal sequences) assigned to each PRB.

Figure 13A:
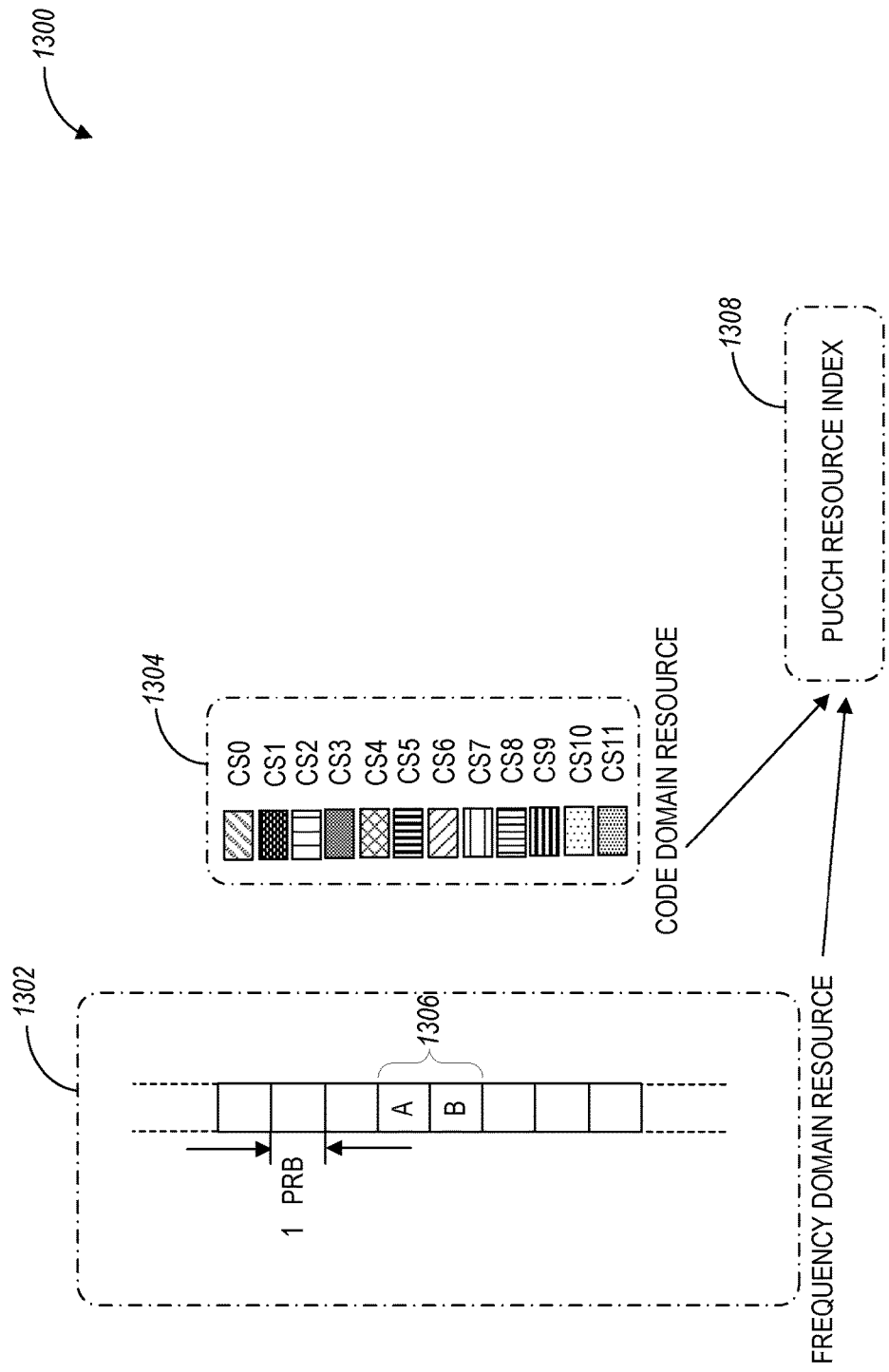
FIG. 13A and FIG. 13B are illustrations of different combinations of frequency and co-domain resources for a short PUCCH with a 1-symbol duration in accordance with some aspects.
Figure 13B:
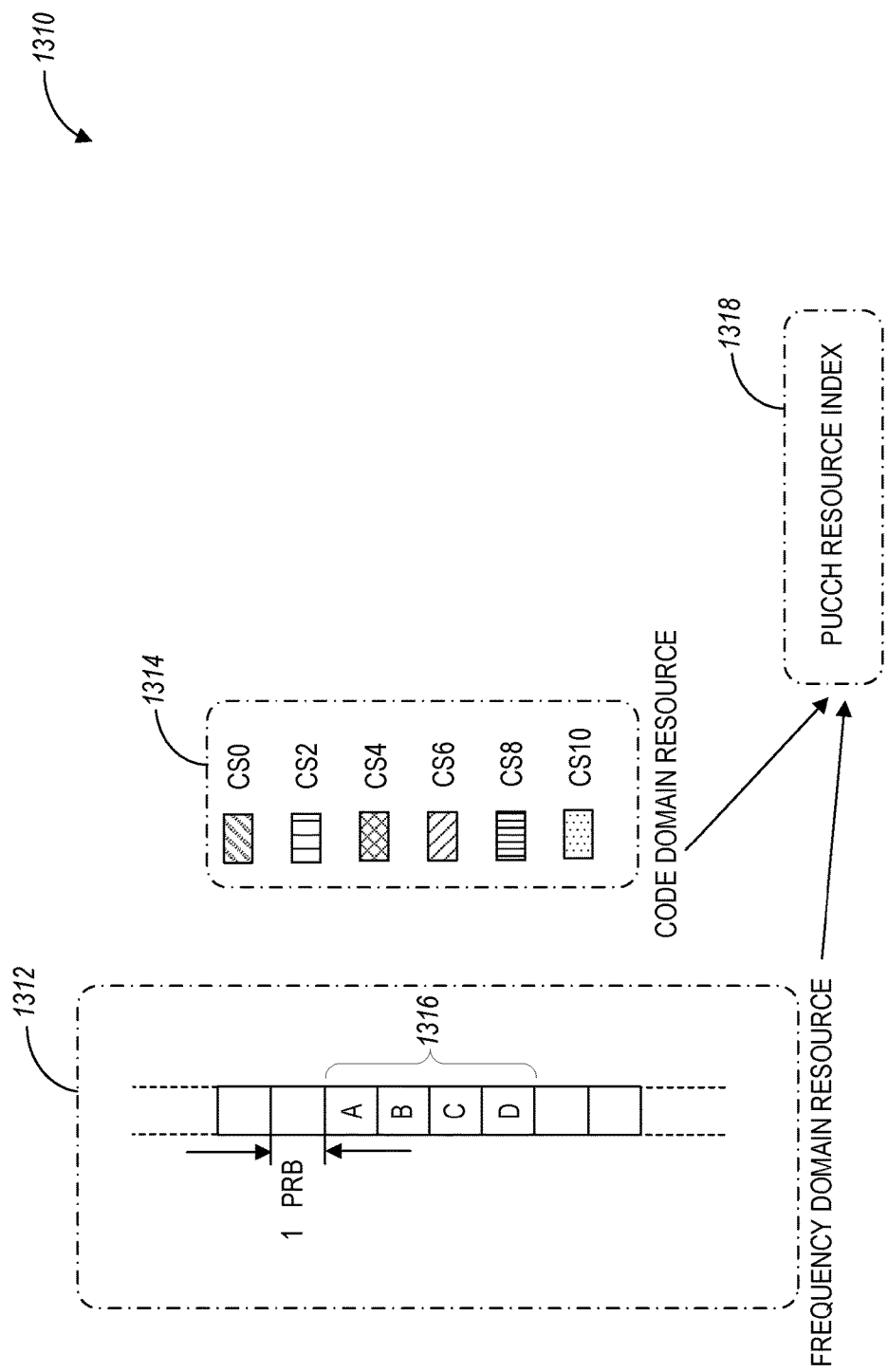

FIG. 13A and FIG. 13B are illustrations of different combinations of frequency and code domain resources for a short PUCCH with a 1-symbol duration in accordance with some aspects. More specifically, FIG. 13A and FIG. 13B illustrate two different ways of assigning a resource index $N_{PUCCH}=24$ independent PUCCH resources.

Referring to FIG. 13A, diagram 1300 illustrates determination of a PUCCH resource index 1308 based on the frequency domain resources 1302 and code domain resources 1304. More specifically, the PUCCH resource index 1308 can be determined as $N_{PUCCH}=24$ based on two PRBs 1306 and twelve cyclic shift values 1304 (or $N_f=2$; $N_c=12$).

Referring to FIG. 13B, diagram 1310 illustrates determination of a PUCCH resource index 1318 based on the frequency domain resources 1312 (e.g., PRBs) and code domain resources 1314 (e.g., different cyclic shift values for cyclically shifting a base sequence). More specifically, the PUCCH resource index 1318 can be determined as $N_{PUCCH}=24$ based on four PRBs 1316 and six cyclic shift values 1314 (or $N_f=4$; $N_c=6$).

In some aspects, four independent resources (i.e. $N_{PUCCH}=4$) can be configured by higher layers to support simultaneous 1-bit HARQ-ACK and SR transmissions for a single UE. The four resources can be configured for a single UE as follows:

(a) The first resource can be configured for 1-bit HARQ-ACK only transmission (i.e., indicating negative SR);

(b) The second resource can configured for 1-bit HARQ-NAK only transmission (i.e., indicating negative SR);

(c) The third resource can be configured for simultaneous 1-bit HARQ-ACK and positive SR transmissions; and (d) The fourth resource can be configured for simultaneous 1-bit HARQ-NAK and positive SR transmissions. In some aspects, this resource can be reused for SR only transmission (i.e. no HARQ is multiplexed with SR) or for the case of simultaneous 1-bit HARQ and SR transmissions when DL grant is missed by the UE, i.e. DTX (discontinuous transmission) for HARQ but still positive SR needs to be transmitted in the same slot. Alternatively, an additional independent resource can be configured for SR only transmission. In this case, a total of five resources can be configured for a given UE for the support of 1-bit HARQ-ACK feedback, SR and 1-bit HARQ-ACK together with SR transmissions.

In some aspects, multiple UEs can be multiplexed in CDM and/or FDM manner within the same slot for SR only or 1-bit HARQ only and/or 1-bit HARQ and positive SR simultaneous transmissions by assigning independent resources to each UE. Since min $N_{PUCCH}=4$ for simultaneous 1-bit HARQ and SR transmission for a single UE, the UE multiplexing capacity for $N_{PUCCH}>4$ would be $\lfloor N_{PUCCH}/4 \rfloor$. For efficient utilization of resources, $N_{PUCCH}$ can be configured to be an integer multiple of 4, where the value of the integer would be configured by higher layer depending on the desired UE multiplexing capacity. For example, as illustrated in FIGS. 13A and 13B, $N_{PUCCH}=24$ can multiplex up to 6 UEs for simultaneous 1-bit HARQ and SR transmissions within the same slot. Alternatively, when 5 resources are configured for a given UE for the support of 1-bit HARQ-ACK feedback, SR and 1-bit HARQ-ACK together with SR transmissions, UE multiplexing capacity for $N_{PUCCH}>5$ would be $\lfloor N_{PUCCH}/5 \rfloor$.

In some aspects, eight independent resources (i.e. $N_{PUCCH}=8$) can be configured by higher layers to support simultaneous 2-bit HARQ-ACK and SR transmissions for a single UE. The eight resources can be configured for a single UE as follows:

(a) Four resources can be configured for 2-bit HARQ only transmission (i.e., indicating negative SR), where the four resources are used to transmit ACK-ACK, ACK-NAK, NAK-ACK and NAK-NAK bits;

(b) Three resources can configured for 2-bit HARQ and positive SR transmissions, where the 2-bit HARQ consists of at least one ACK bit, i.e. either ACK-ACK or ACK-NAK or NAK-ACK;

(c) The last resource can be configured for simultaneous 2-bit HARQ and positive SR transmissions where none of the HARQ-bits are ACK, i.e. HARQ can be either NAK-NAK or DTX. Similar to the 1-bit case, this resource can be reused for SR only transmission (i.e. no HARQ is multiplexed with SR). Alternatively, an additional independent resource can be configured for SR only transmission. In this case, a total of nine resources can be configured for a given UE for the support of 2-bit HARQ-ACK feedback, SR and 2-bit HARQ-ACK together with SR transmissions.

In some aspects, multiple UEs can be multiplexed in CDM and/or FDM manner within the same slot for SR only or 2-bit HARQ-ACK only and/or 2-bit HARQ-ACK and positive SR simultaneous transmissions by assigning independent resources to each UE. Since min $N_{PUCCH}$=8 for simultaneous 2-bit HARQ-ACK and SR transmissions for a single UE, the UE multiplexing capacity for $N_{PUCCH}$>8 would be $\lfloor N_{PUCCH}/8 \rfloor$. For efficient utilization of resources, $N_{PUCCH}$ can be configured to be an integer multiple of 8 in this case, where the value of the integer would be configured by higher layer depending on the desired UE multiplexing capacity. For example, as illustrated in FIGS. 13A and 13B, $N_{PUCCH}$=24 can multiplex up to 3 UEs for simultaneous 2-bit HARQ-ACK and SR transmissions within the same slot. Alternatively, when 9 resources are configured for a given UE for the support of 2-bit HARQ-ACK feedback, SR and 2-bit HARQ-ACK together with SR transmissions, UE multiplexing capacity for $N_{PUCCH}$>9 would be $\lfloor N_{PUCCH}/9 \rfloor$.

FIG. 14 is an illustration of an uplink control channel including long duration PUCCH (long PUCCH) and short duration PUCCH (short PUCCH) in accordance with some aspects. Referring to FIG. 14, there is illustrated a slot 1400 which can include short PUCCH 1408 and long PUCCH 1406. Both long and short duration PUCCHs can be used by UEs to carry UCI to NR gNBs. Multiple DFT-s-OFDM (Discrete Fourier Transform spread Orthogonal Frequency Division Multiplexing) waveform symbols can be allocated for the long PUCCH 1406 to improve link budget and uplink coverage for control channel. More specifically, long PUCCH 1406 can be multiplexed with the UL data channel (i.e., PUSCH 1410), in frequency division multiplexing (FDM) manner. The short PUCCH 1408 can be multiplexed with the PUSCH 1410 in time division multiplexing (TDM) manner and may employ one or two symbols. In order to accommodate the DL to UL and UL to DL switching time and round-trip propagation delay, a guard period (GP) 1404 is inserted between the NR physical downlink control channel (NR PDCCH) 1402 and the PUSCH 1410.

The duration of the long PUCCH 1406 can vary depending on the presence and duration of other physical channels. In FIG. 14, PDCCH 1402 and short PUCCH 1408 each takes one symbol duration. In other aspects, the short PUCCH 1408 may not be present in the slot and then duration of the long PUCCH 1406 can take one more symbol than the durations shown in FIG. 14. In other aspects, either PDCCH 1402 or the short PUCCH 1408 may have two symbols, and then duration of the long PUCCH 1406 can become shorter than the duration shown in FIG. 14. Additionally, duration of the slot can be reduced by half, resulting in having half of the symbols within a slot compared to the slot 1400 in FIG. 14, and then duration of the long PUCCH 1406 can shrink accordingly based on having a reduced number of symbols. Structure of the long PUCCH 1406 in terms of UCI and DMRS (Demodulation Reference Signal), which helps the receiver to recover the received signal and detect the UCI, can be designed so that performance and resource efficiency of long PUCCH are robust against the change in the duration of long PUCCH.

The Table below illustrates different formats of PUCCH, based on length in OFDM symbols and number of UCI bits carried by the PUCCH.

| PUCCH format | Short/Long | Length in OFDM symbols | Number of UCI bits |
|---|---|---|---|
| 0 | Short | 1~2 | ≤2 |
| 1 | Long | 4~14 | ≤2 |
| 2 | Short | 1~2 | >2 |
| 3 | Long | 4~14 | >2, <N |
| 4 | Long | 4~14 | >2 |

Techniques disclosed herein relate to allocating and indicating resources for the UEs on which the respective UEs can transmit their PUCCHs without colliding with the other PUCCHs transmitted in the same slot. The resources for PUCCH transmissions includes one or combination of the following: physical resource blocks (PRBs) which comprises a set of subcarriers, cyclic shift index of the employed base sequence, and index of the orthogonal cover code (OCC) applied to the corresponding PUCCH, to name a few. The techniques disclosed herein can apply to any of the PUCCH formats provided in the above table.

Candidate sets of PUCCH resources can be pre-configured to each UE by RRC signaling and a field in the DL control information (DCI) of the PDCCH, indicating (for each UE) which set among the pre-configured candidate sets to use for the corresponding PUCCH transmission. The number of pre-configurable candidate resource sets are limited due to overhead of the DCI field which increases in accordance to the number of pre-configured resource sets and an increase in RRC configuration overhead. This limited configuration can result in an increase in PUCCH resource collision probability between the UEs and potential loss of the corresponding UCI at the gNB receiver, especially, in cases that many UEs are scheduled to transmit PUCCH in the same slot. Techniques disclosed herein can be used to overcome these deficiencies.

In some aspects, the index of the Control Channel Element (CCE), which is used for the PDCCH carrying the DCI to indicate the PUCCH resource, provides an offset to the indicated resource. The corresponding UE transmits its PUCCH on the resource which is determined by applying the offset to the resource indicated by the DCI field. Other types of DL resources relating to the PDCCH transmission, e.g., Control Resource Set (CORESET) can be used as well to enable providing an offset to the indicated PUCCH resource and adjusting the resource for the corresponding UE. By using an offset into the configured PUCCH resource potential collisions with other PUCCH transmissions can be avoided. More specifically, using the offset enables for the gNB to avoid collision between the PUCCHs from different UEs by adjusting the resource index by selecting the CCE used for the corresponding PDCCH for each of the UEs, even in cases that the pre-configured PUCCH resources overlap between different UEs.

Figure 15:
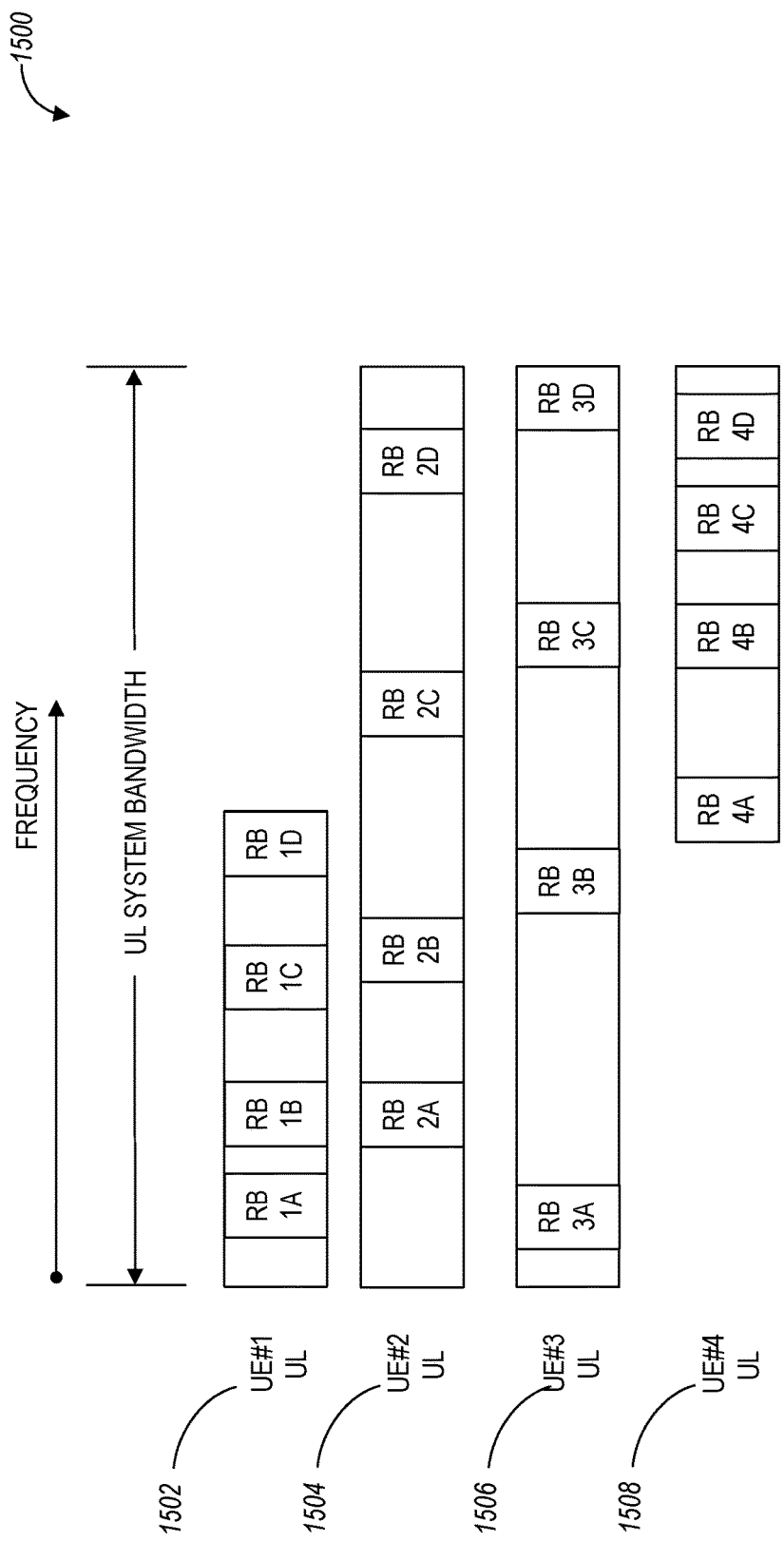
FIG. 15 is an illustration of resource configuration for a physical uplink control channel in accordance with some aspects.

FIG. 15 is an illustration of resource configuration for a physical uplink control channel in accordance with some aspects. Referring to FIG. 15, there is illustrated a PUCCH transmission 1500 by multiple UEs (e.g., 1502, 1504, 1506, and 1508) with an uplink system bandwidth. As seen in FIG. 15, each of the UEs 1502-1508 can be configured with an UL carrier (resource block or RB) which may occupy a part of or the entire system bandwidth. In FIG. 15, UL carriers for UE #1 and UE #4 are configured in either lower or upper half of the UL system bandwidth, and UL carriers for UE #2 and UE #3 are configured with the full system bandwidth.

Within the configured UL carrier, it is assumed that each UE 1502-1508 is pre-configured with four candidates of RBs by, e.g., higher layer signaling. Each candidate resource may consist of a single or multiple RBs. For example, PUCCHs which can be configured to carry dozens of UCI bits like NR PUCCH formats 2 and 3, can require multiple RBs and thus some candidates may consist of multiple RBs to support the corresponding PUCCH transmissions to carry dozens of UCI bits. On the other hand, a certain candidate resource may consist of a single physical resource block (or PRB), which can be useful for PUCCH formats that carry 1 or 2 UCI bits. Although only four UEs are shown in FIG. 15 for illustration purposes, many more UEs (e.g., a few hundred UEs) can be served within the UL system bandwidth. In such scenario, it becomes more likely that the configured resources overlap among the UEs. Accordingly, this can increase resource collision probability when multiple UEs transmit PUCCH in the same slot.

In some aspects, DCI carried on the PDCCH can indicate which one among the configured candidates to use for the corresponding PUCCH transmission for the UE. As four candidate resources are configured to each UE in the example illustration in FIG. 15, two bits can be configured for the DCI field to indicate which resource among the four candidates to use in the corresponding PUCCH transmission.

In some aspects, the pre-configured candidate resources can include other resources, such as sequence index and symbol index in addition to the RB index. Aspects disclosed herein can apply regardless of whether the pre-configured candidate resource sets include only a single type of the resource (e.g., PRB only) or plural types of resources (e.g., a PRB index, a sequence index, and a symbol index).

Figure 16:
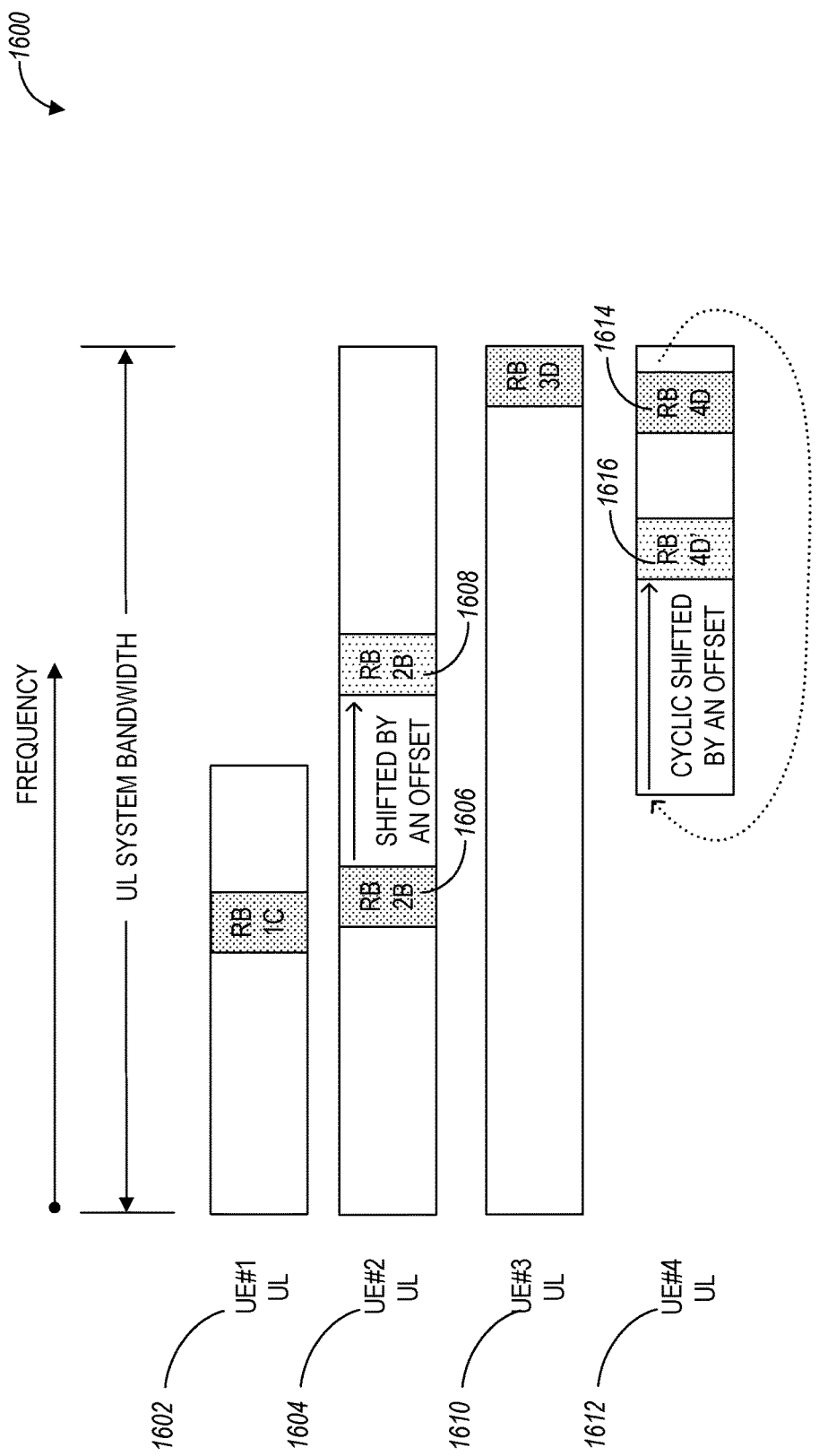
FIG. 16 is an illustration of resource allocation and resource shifting for a physical uplink control channel in accordance with some aspects.

FIG. 16 is an illustration of resource allocation and resource shifting for a physical uplink control channel in accordance with some aspects. More specifically, FIG. 16 illustrates an exemplary communication scheme 1600 to avoid PUCCH resource collision among the UEs 1602, 1604, 1610, and 1612. In FIG. 16, it is assumed that UE #1-UE #4 are indicated via DCI to transmit their PUCCH on RB #1c, RB #2b, RB #3d and RB #4d, respectively. As selection of the RBs for the respective UEs can take into account scheduling of data and control channels for the UEs other than UE #1-UE #4 as well, it can happen that the RBs indicated for the PUCCH transmission can overlap among the UEs. For example and as seen in FIG. 16, PUCCH transmissions on RB #1c and RB #2b (1606) for UE #1 and UE #2 will collide on a part of the frequency region as seen in the figure. Also, PUCCH transmissions on RB #3d and RB #4d (1614) for UE #3 and UE #4 will collide on a part of the frequency region.

In some aspects, in order to avoid the resource collision and relax the gNB scheduler burden to select a non-colliding resource to transmit PUCCH for each UE, an additional scheme can be employed to shift the RB for a UE's PUCCH transmission to an RB which does not collide with PUCCH transmissions from other UEs. In an aspect, DL CCE used by the PDCCH carrying the DCI for the corresponding UE, can be used to provide an offset to shift the RB, based on the below equation:

$$RB\_\{idx,PUCCH\}=RB\_\{idx,explicit\}+CCE\_\{idx,start\},$$

where RB_{idx,explicit} is the index of the RB indicated (selected) by the DCI for the UE's PUCCH transmission among the pre-configured candidate RBs, CCE_{idx,start} is the index of the starting CCE resource used for the PDCCH carrying the DCI for the UE, and RB_{idx, PUCCH} is the index of the RB which is actually used for the PUCCH transmission as a result of the shifting.

For example and as illustrated in FIG. 16, RB #2b' (1608) for the UE #2 can be obtained by adding the index of the starting CCE of the PDCCH for the UE as an offset to RB #2b. The index of the ending CCE for the PDCCH can be employed in the above equation instead of CCE_{idx,start} and this variation can similarly be applied to the schemes disclosed henceforth. Similarly, an asset can be applied to RB #4d (1614) to obtain a new non-colliding RB, RB #4d' (1616) for the PUCCH transmission by UE 1612.

In some aspects, in order to relax the constraint to select the CCE for the UE, modulo operation can be applied to the CCE index as follows:

$$RB\_\{idx,PUCCH\}=RB\_\{idx,explicit\}+modulo(CCE\_\{idx,start\},K),$$

where K is a constant which can be fixed or configured by L1/L2 signaling or higher layer signaling via NR minimum system information (MSI), NR remaining minimum system information (RMSI), NR other system information (OSI), or radio resource control (RRC) signaling. Due to the modulo operation, different CCE indexes can result in the same offset value and gNB can have flexibility to choose the CCE resource for the PDCCH transmission for each UE, which is especially helpful in scenarios where many UEs are scheduled in the slot.

In some aspects, the modulo operation can be applied to the whole equation as indicated below, in order to enable the shifting in a wraparound manner within the UL bandwidth:

$$RB\_\{idx,PUCCH\}=modulo(RB\_\{idx,explicit\}+modulo(CCE\_\{idx,start\},K),M),$$

where M is a constant which can be fixed or configured by L1/L2 signaling or higher layer signaling previously mentioned herein above, or equal to the number of PRBs comprising the UL carrier or UL bandwidth part, which is configured within the UL carrier, for a given UE. In FIG. 16, the cyclically shifted RB for the UE #4, RB #4d' (1616), can be obtained by adding the index of the starting CCE of the PDCCH for the UE as an offset to RB #4d and then applying the modulo operation to the result. For the cyclic shift operation within the UE's UL carrier bandwidth, M can be less than or equal to the maximum index of the PRB within the UE #4's UL bandwidth.

In aspects when the index of the first RB within the UE #4's UL carrier is a non-zero value (e.g., P), that value can be added to the modulo operation as indicated in the equation below:

$$RB\_\{idx,PUCCH\}=modulo(RB\_\{idx,explicit\}+modulo(CCE\_\{idx,start\},K),M)+P.$$

In some aspects, P can be a parameter which is configured in a CORESET specific manner or the index of the first RB for UL BWP or a combination thereof.

In some aspects, an index of other types of PDCCH resources, such as CORESET and PRB used for the corresponding PDCCH transmission, can be used in place of the CCE index in the aforementioned equations.

In some aspects, in case of NR PUCCH formats 0, 1, 2, 3 and 4, a Constant Amplitude Zero Auto Correlation (CAZAC) sequence and/or an Orthogonal Cover Code (OCC) can comprise the PUCCH resource. PUCCHs from different UEs can be multiplexed on the same RB by applying different cyclic shifts of the sequence and/or an OCC between the UEs. The aforementioned schemes to provide an offset to the PUCCH resource by the index of a PDCCH resource can be applied to the cyclic shift index, the OCC index, the starting symbol index and other types of PUCCH resources. That is, for all the formulations above, the RB indexes can be replaced with indexes corresponding to the cyclic shift, the OCC, or starting symbol or any corresponding PUCCH resource, as provided below as an example for the cyclic shift index:

CS_{idx,PUCCH}=modulo(CS_{idx,explicit}+modulo (CCE_{idx,start}, K), M), where CS_{idx,explicit} is the index of the cyclic shift indicated(selected) by the DCI for the UE's PUCCH transmission among the pre-configured candidate cyclic shift values, CCE_{idx,start} is the index of the starting CCE resource used for the PDCCH carrying the DCI for the UE, and CS_{idx,PUCCH} is the index of the cyclic shift of the sequence which is used for the PUCCH transmission as a result of the shifting. In this case, M can be determined considering the range of the cyclic shift values, which is 12 in case of length-12 sequence.

In some aspects, a parameter which combines one or more of the starting RB index, the starting CS index, and the OCC index can be specified. Furthermore, aforementioned techniques can be directly applied to determine the value of the parameter, as indicated in the equation below (the other equations provided above can also be extended for the combined resource index likewise):

n_{idx,PUCCH}=n_{idx,explicit}+modulo (CCE_{idx,start}, K), where n_{idx,PUCCH} is the resource index for the combination of one or more of the starting RB index, the starting CS index, the OCC index, and/or other PUCCH resources. Based on this parameter, the starting RB index, the starting CS index, and/or the OCC index can be derived accordingly. For instance, the following equation can be used: n_{idx,PUCCH}=c0*RB_{idx,PUCCH}+c1*CS_{idx,PUCCH}+c2*OCC_{idx,PUCCH}, where c0, c1 and c2 are constants, which can be predefined in a 5G-NR specification, and OCC_{idx,PUCCH} is the index of the OCC which is actually used for the PUCCH transmission. In some aspects, the modulo operation can be applied for the determination of the starting RB index, the starting CS index, and/or the OCC index to ensure that the starting RB index is within the configured UL BWP, the starting CS index is within the maximum number of CS, and the OCC index is within the maximum number of OCC.

In aspects, techniques disclosed herein can be applied to all the PUCCH formats or a part of the PUCCH formats, e.g., NR PUCCH formats 0 and 2 with which more UEs may be scheduled than the other formats and multiple UEs can be multiplexed on the same PRB. Additionally, the aforementioned techniques can apply for cases when PUCCH resource set configuration is not available at the UE from RRC signaling. In particular, the explicit value in the n_{idx,PUCCH} equation above may be indicated by DCI from a set of values which are configured by, e.g., NR RMSI. Further, the aforementioned techniques can be applied to cases that a single resource set is configured or indicated to the UE either by higher layers or L1 signaling, without pre-configuring candidate sets of the resources.

Figure 17:
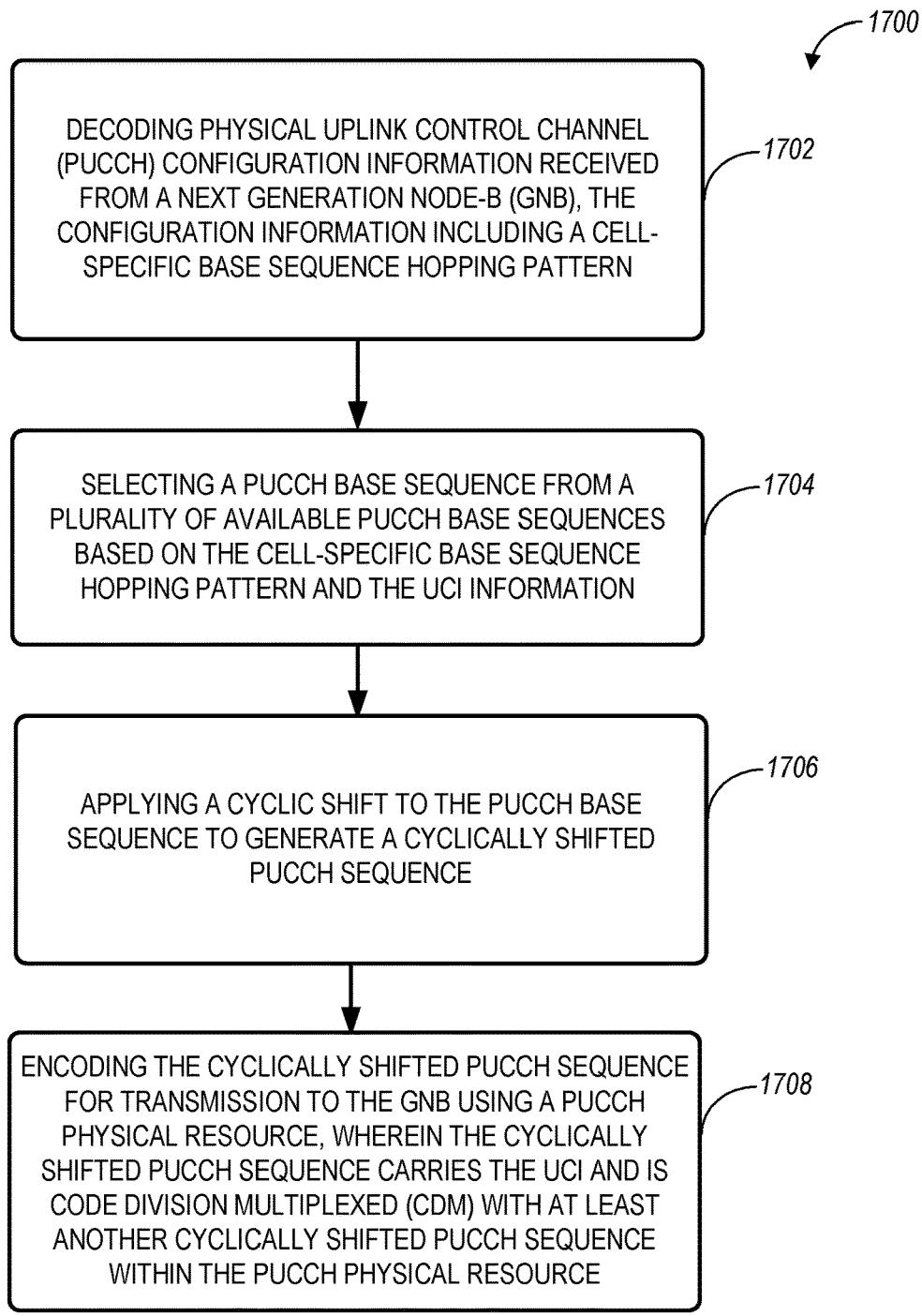
FIG. 17 illustrates generally a flowchart of example functionalities which can be performed in a wireless architecture in connection with PUCCH communication, in accordance with some aspects.

FIG. 17 illustrates generally a flowchart of example functionalities which can be performed in a wireless architecture in connection with PUCCH communication, in accordance with some aspects. Referring to FIG. 17, the example method 1700 can start with operation 1702, when processing circuitry of a UE decodes physical uplink control channel (PUCCH) configuration information received from a Next Generation Node-B (gNB). The configuration information can include a cell-specific base sequence hopping pattern. At operation 1704, a PUCCH base sequence can be selected from a plurality of available PUCCH base sequences based on the cell-specific base sequence hopping pattern and based on uplink control information available at the UE. At operation 1706, a cyclic shift can be applied to the PUCCH base sequence to generate a cyclically shifted PUCCH sequence. At operation 1708, the cyclically shifted PUCCH sequence can be encoded for transmission to the gNB (e.g., 111) using a PUCCH physical resource. The cyclically shifted PUCCH sequence can be configured to carry the UCI and can be code division multiplexed (CDM) with at least another cyclically shifted PUCCH sequence within the PUCCH physical resource (for example, as illustrated and discussed in connection with FIG. 10 and FIG. 11).

Figure 18:
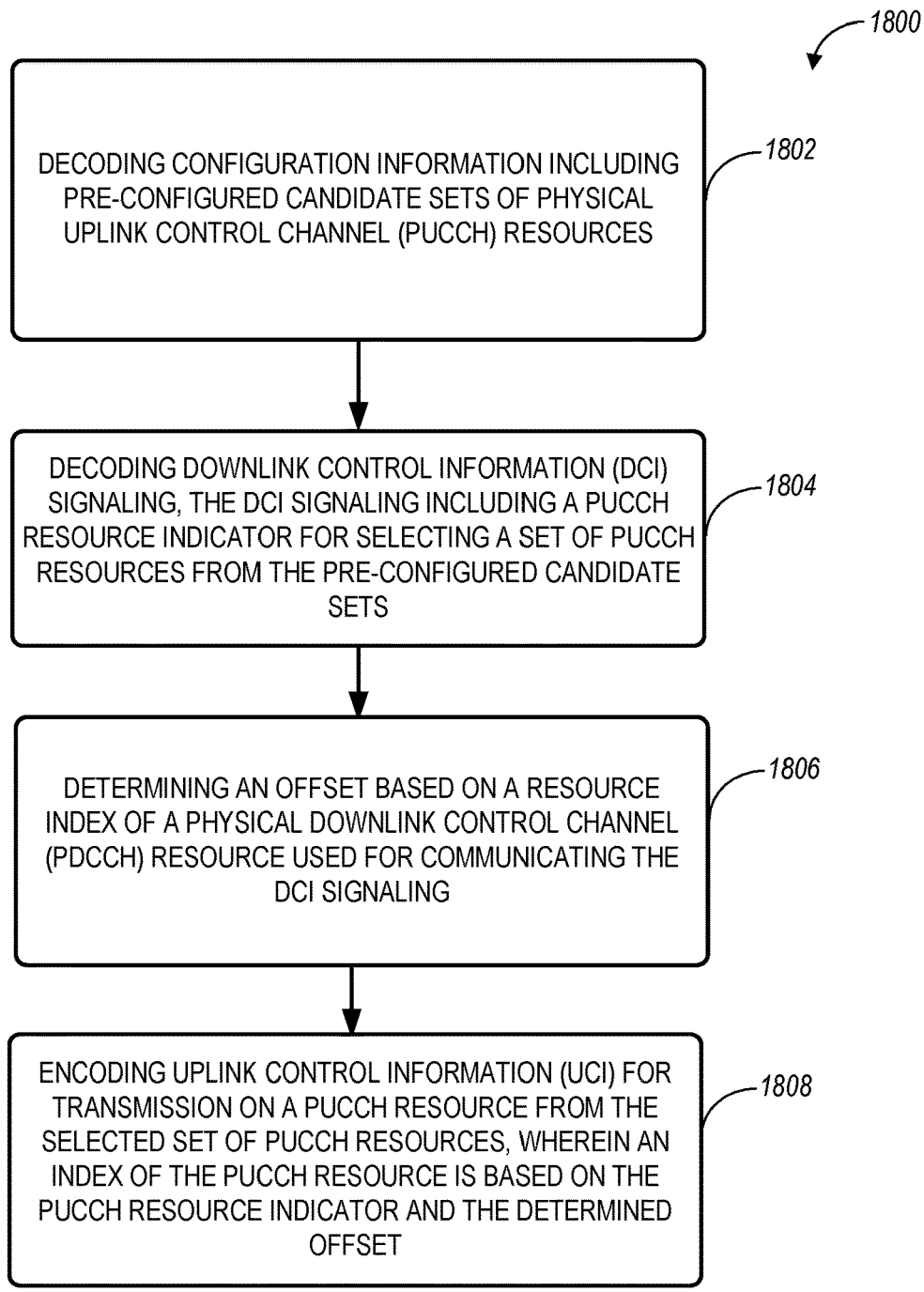
FIG. 18 illustrates generally a flowchart of example functionalities which can be performed in a wireless architecture in connection with resource allocation and indication for PUCCH, in accordance with some aspects.

FIG. 18 illustrates generally a flowchart of example functionalities which can be performed in a wireless architecture in connection with resource allocation and indication for PUCCH, in accordance with some aspects. Referring to FIG. 18, the example method 1800 can start at operation 1802, when configuration information including pre-configured candidate sets of physical uplink control channel (PUCCH) resources can be decoded. For example, the UE 101 can receive information on preconfigured candidate sets of PUCCH resources, which include one or more of the following: at least one index of a resource block resource, a cyclic shift index, and OCC index, and starting symbol index be a higher layer signaling such as RRC signaling.

At operation 1804, downlink control information (DCI) signaling is decoded, where the DCI signaling includes a PUCCH resource indicator for selecting a set of PUCCH resources from the pre-configured candidate sets. More specifically, UE 101 can be configured to receive via PDCCH an explicit indication on which one among the candidate sets to use for corresponding PUCCH transmission. At operation 1806, an offset can be determined based on a resource index of a physical downlink control channel (PDCCH) resource used for communicating the DCI signaling. More specifically, UE 101 can acquire or determine an additional offset to adjust the indicated resource index, implicitly from the resource index used for the corresponding PDCCH information, such as CCE, CORESET, and PRB index associated with the PDCCH transmission.

At operation 1808, uplink control information (UCI) is encoded for transmission on a PUCCH resource from the selected set of PUCCH resources, where an index of the PUCCH resource is based on the PUCCH resource indicator and the determined offset. More specifically, UE 101 can apply the offset to the PUCCH resource index indicated explicitly by RRC and/or DCI signaling, and can compute the index of the resource to be used for the PUCCH transmission. The UE can then transmit the PUCCH on the adjusted PUCCH resource.

Figure 19:
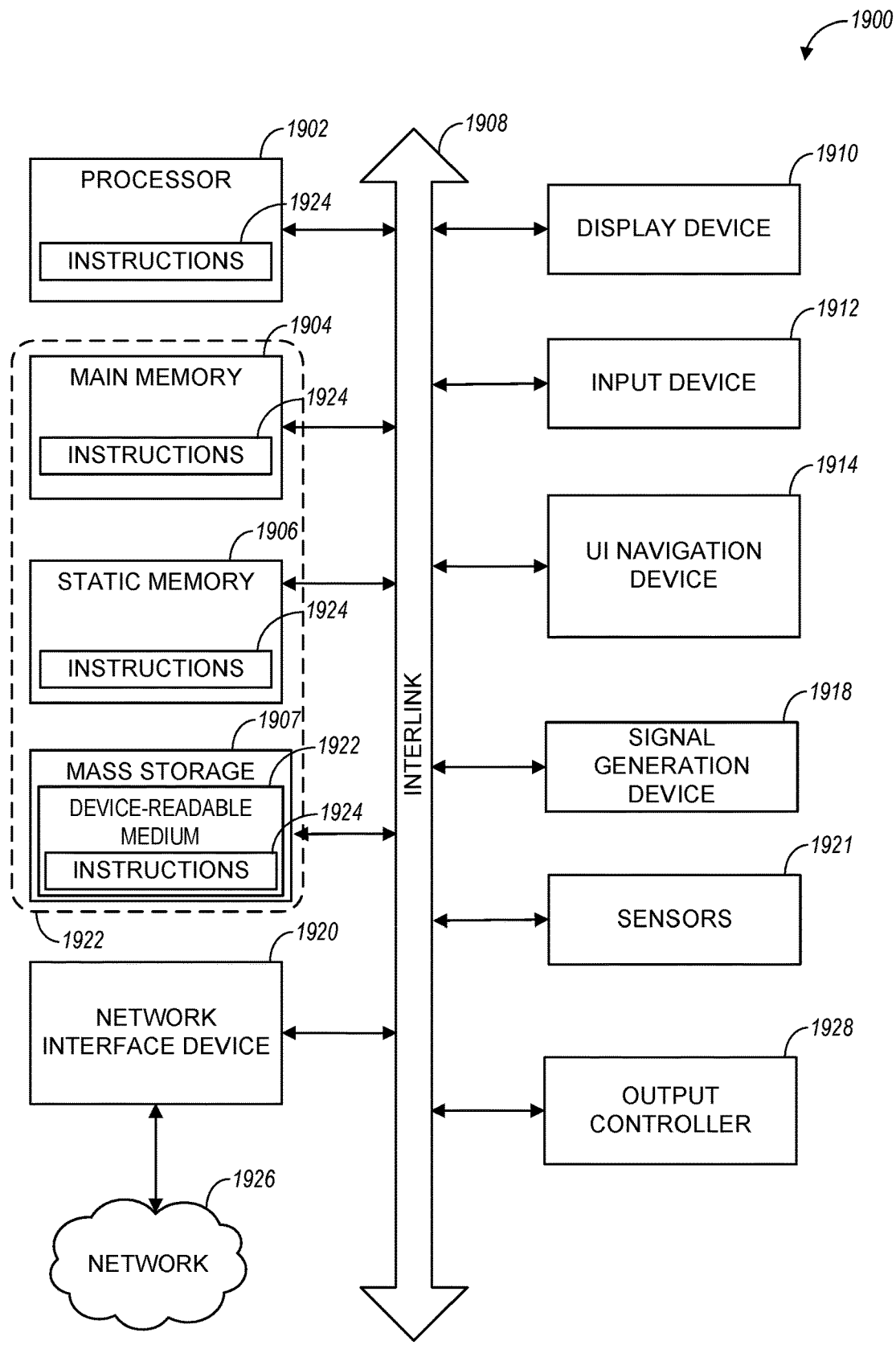
FIG. 19 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 19 illustrates a block diagram of a communication device such as an evolved Node-B (eNB), a new generation Node-B (gNB), an access point (AP), a wireless station (STA), a mobile station (MS), or a user equipment (UE), in accordance with some aspects. In alternative aspects, the communication device 1900 may operate as a standalone device or may be connected (e.g., networked) to other communication devices.

Circuitry (e.g., processing circuitry) is a collection of circuits implemented in tangible entities of the device 1900 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired).

In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1900 follow.

In some aspects, the device 1900 may operate as a standalone device or may be connected (e.g., networked) to other devices. In a networked deployment, the communication device 1900 may operate in the capacity of a server communication device, a client communication device, or both in server-client network environments. In an example, the communication device 1900 may act as a peer communication device in peer-to-peer (P2P) (or other distributed) network environment. The communication device 1900 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 1900 may include a hardware processor 1902 (e.g., a central processing unit (CPU), a graphics processing unit (GPU), a hardware processor core, or any combination thereof), a main memory 1904, a static memory 1906, and mass storage 1907 (e.g., hard drive, tape drive, flash storage, or other block or storage devices), some or all of which may communicate with each other via an interlink (e.g., bus) 1908.

The communication device 1900 may further include a display device 1910, an alphanumeric input device 1912 (e.g., a keyboard), and a user interface (UI) navigation device 1914 (e.g., a mouse). In an example, the display device 1910, input device 1912 and UI navigation device 1914 may be a touch screen display. The communication device 1900 may additionally include a signal generation device 1918 (e.g., a speaker), a network interface device 1920, and one or more sensors 1921, such as a global positioning system (GPS) sensor, compass, accelerometer, or other sensor. The communication device 1900 may include an output controller 1928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1907 may include a communication device-readable medium 1922, on which is stored one or more sets of data structures or instructions 1924 (e.g., software) embodying or utilized by any one or more of the techniques or functions described herein. In some aspects, registers of the processor 1902, the main memory 1904, the static memory 1906, and/or the mass storage 1907 may be, or include (completely or at least partially), the device-readable medium 1922, on which is stored the one or more sets of data structures or instructions 1924, embodying or utilized by any one or more of the techniques or functions described herein. In an example, one or any combination of the hardware processor 1902, the main memory 1904, the static memory 1906, or the mass storage 1916 may constitute the device-readable medium 1922.

As used herein, the term "device-readable medium" is interchangeable with "computer-readable medium" or "machine-readable medium". While the communication device-readable medium 1922 is illustrated as a single medium, the term "communication device-readable medium" may include a single medium or multiple media (e.g., a centralized or distributed database, and/or associated caches and servers) configured to store the one or more instructions 1924.

The term "communication device-readable medium" may include any medium that is capable of storing, encoding, or carrying instructions (e.g., instructions 1924) for execution by the communication device 1900 and that cause the communication device 1900 to perform any one or more of the techniques of the present disclosure, or that is capable of storing, encoding or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 1924 may further be transmitted or received over a communications network 1926 using a transmission medium via the network interface device 1920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1920 may include one or more physical jacks (e.g., Ethernet, coaxial, or phone jacks) or one or more antennas to connect to the communications network 1926. In an example, the network interface device 1920 may include a plurality of antennas to wirelessly communicate using at least one of single-input multiple-output (SIMO), MIMO, or multiple-input single-output (MISO) techniques. In some examples, the network interface device 1920 may wirelessly communicate using Multiple User MIMO techniques.

The term "transmission medium" shall be taken to include any intangible medium that is capable of storing, encoding or carrying instructions for execution by the communication device 1900, and includes digital or analog communications signals or other intangible medium to facilitate communication of such software. In this regard, a transmission medium in the context of this disclosure is a device-readable medium.

Additional Notes and Examples

Example 1 is an apparatus of a Next Generation Node-B (gNB), the apparatus comprising: processing circuitry, the processing circuitry configured to: encode a base sequence hopping pattern for transmission within a cell of the gNB; decode physical uplink control channel (PUCCH) information, wherein the PUCCH information includes, long duration PUCCH information and short duration PUCCH information multiplexed within a same physical resource, and wherein the long duration PUCCH information and the short duration PUCCH information are associated with base sequences selected from a plurality of available base sequences using the base sequence hopping pattern; and determine uplink control information (UCI) based on the short duration PUCCH information and the long duration PUCCH information; and memory coupled to the processing circuitry, the memory configured to store the base sequence hopping pattern.

In Example 2, the subject matter of Example 1 includes, wherein the long duration PUCCH information is received from a first user equipment (UE) within the cell, and the short duration PUCCH information is received from a second UE within the cell.

In Example 3, the subject matter of Examples 1-2 includes, wherein the base sequence hopping pattern is configured to vary on one or both of a symbol basis and a slot basis.

In Example 4, the subject matter of Examples 1-3 includes, wherein the processing circuitry is further configured to: encode a cyclic shift hopping pattern for transmission within the cell, the cyclic shift hopping pattern for further randomizing a PUCCH sequence.

In Example 5, the subject matter of Example 4 includes, wherein the short duration PUCCH information is associated with a first base sequence of the plurality of base sequences and the long duration PUCCH information is associated with a second base sequence of the plurality of base sequences, the first and second base sequences being randomized by the cyclic shift hopping pattern.

In Example 6, the subject matter of Examples 4-5 includes, wherein the cyclic shift hopping pattern is based on one or more of the following: a physical cell ID of the cell; a virtual cell ID of the cell; a symbol index of a PUCCH resource; and a slot index of a PUCCH resource.

In Example 7, the subject matter of Examples 1-6 includes, wherein the long duration PUCCH information and the short duration PUCCH information are code division multiplexed (CDM) within the same physical resource.

In Example 8, the subject matter of Example 7 includes, wherein the physical resource is a slot including 7 or 14 symbols, and wherein the long duration PUCCH information and the short duration PUCCH information are code division multiplexed within one or two of the symbols of the slot.

In Example 9, the subject matter of Examples 1-8 includes, transceiver circuitry coupled to the processing circuitry; and, one or more antennas coupled to the transceiver circuitry.

Example 10 is an apparatus of a user equipment (UE), the apparatus comprising: processing circuitry, wherein to configure the UE for communicating uplink control information (UCI), the processing circuitry is to: decode physical uplink control channel (PUCCH) configuration information received from a Next Generation Node-B (gNB), the configuration information including a cell-specific base sequence hopping pattern; select a PUCCH base sequence from a plurality of available PUCCH base sequences based on the cell-specific base sequence hopping pattern and the UCI information; apply a cyclic shift to the PUCCH base sequence to generate a cyclically shifted PUCCH sequence; and encode the cyclically shifted PUCCH sequence for transmission to the gNB using a PUCCH physical resource, wherein the cyclically shifted PUCCH sequence carries the UCI and is code division multiplexed (CDM) with at least another cyclically shifted PUCCH sequence within the PUCCH physical resource; and memory coupled to the processing circuitry, the memory configured to store the cell-specific base sequence hopping pattern.

In Example 11, the subject matter of Example 10 includes, wherein the PUCCH configuration information further includes a cyclic shift hopping pattern, and the processing circuitry is further to: apply the cyclic shift to the PUCCH base sequence based on the cyclic shift hopping pattern to generate the cyclically shifted PUCCH sequence.

In Example 12, the subject matter of Example 11 includes, wherein the cyclic shift hopping pattern is based on one or more of the following: a physical cell ID of a cell of the gNB that includes the UE; a virtual cell ID of the cell; a symbol index of a PUCCH resource; and a slot index of a PUCCH resource.

In Example 13, the subject matter of Examples 10-12 includes, wherein the cyclically shifted PUCCH sequence carries one or two bits of the UCI, and wherein the UCI includes one or both of a hybrid automatic repeat request acknowledgement (HARQ-ACK) feedback information and a scheduling request (SR).

In Example 14, the subject matter of Examples 10-13 includes, wherein the cyclically shifted PUCCH sequence is a long duration PUCCH sequence and the at least another cyclically shifted PUCCH sequence is a short duration PUCCH sequence originating from a second UE.

In Example 15, the subject matter of Examples 10-14 includes, wherein the cyclically shifted PUCCH sequence is a short duration PUCCH sequence and the at least another cyclically shifted PUCCH sequence is a long duration PUCCH sequence originating from a second UE.

In Example 16, the subject matter of Examples 10-15 includes, wherein the cell-specific base sequence hopping pattern is configured to vary on one or both of a symbol basis and a slot basis.

In Example 17, the subject matter of Examples 10-16 includes, wherein the processing circuitry is further to: encode a short duration PUCCH information to carry one or two bits of the UCI information within one or two symbols of the PUCCH physical resource, wherein the short duration PUCCH information includes a first PUCCH sequence for PUCCH information to be transmitted in a first symbol of the two symbols, the first PUCCH sequence generated by applying a first cyclic shift to the PUCCH base sequence.

In Example 18, the subject matter of Example 17 includes, wherein the processing circuitry is further to: decode the PUCCH configuration information to obtain a cyclic shift offset value, wherein the short duration PUCCH information includes a second PUCCH sequence for PUCCH information to be transmitted in a second symbol of the two symbols, the second PUCCH sequence generated by applying the first cyclic shift with an offset based on the cyclic shift offset value to the PUCCH base sequence.

In Example 19, the subject matter of Examples 11-18 includes, wherein the processing circuitry is further to: encode a short duration PUCCH information to carry one or two bits of the UCI information within two symbols of the PUCCH physical resource, wherein the short duration PUCCH information is based on applying the cyclic shift to a second PUCCH base sequence from the plurality of available PUCCH base sequences, the cyclic shift based on the cyclic shift hopping pattern.

In Example 20, the subject matter of Example 19 includes, wherein the cyclic shift hopping pattern is one or both of: a cell-specific hopping pattern; and a UE-specific hopping pattern.

In Example 21, the subject matter of Examples 10-20 includes, wherein the processing circuitry is further to: decode the PUCCH configuration information to obtain a plurality of independent PUCCH resources for transmitting the UCI via a short duration PUCCH with one symbol duration.

In Example 22, the subject matter of Example 21 includes, wherein the UCI comprises a single bit and the plurality of independent PUCCH resources comprises: a first PUCCH resource configured for 1-bit hybrid automatic repeat request acknowledgement (HARQ-ACK) only transmission and indicating a negative scheduling request (SR); a second PUCCH resource configured for 1-bit hybrid automatic repeat request non-acknowledgement (HARQ-NACK) only transmission indicating a negative SR; a third PUCCH resource configured for simultaneous 1-bit HARQ-ACK and a positive SR transmission; a fourth PUCCH resource configured for simultaneous 1-bit HARQ-NAK and a positive SR transmission; and a fifth PUCCH resource configured for an SR-only transmission.

In Example 23, the subject matter of Examples 21-22 includes, wherein the UCI comprises two bits and the plurality of independent PUCCH resources comprises: a first set with four PUCCH resources configured for 2-bit HARQ-only transmissions and indicating a negative SR, wherein the first set of four PUCCH resources are used to transmit ACK-ACK, ACK-NAK, NAK-ACK and NAK-NAK bits; a second set with three PUCCH resources configured for 2-bit HARQ and positive SR transmissions, wherein the 2-bit HARQ transmission includes at least one ACK bit consisting of one of the following: an ACK-ACK transmission, an ACK-NAK transmission, and a NAK-ACK transmission; an eighth PUCCH resource configured for simultaneous 2-bit HARQ and positive SR transmissions, wherein none of the HARQ-bits are ACK bits; and a ninth PUCCH resource configured for an SR-only transmission.

In Example 24, the subject matter of Examples 10-23 includes, transceiver circuitry coupled to the processing circuitry; and, one or more antennas coupled to the transceiver circuitry.

Example 25 is a computer-readable storage medium that stores instructions for execution by one or more processors of a user equipment (UE), the instructions to configure the one or more processors to cause the UE to: decode configuration information including pre-configured candidate sets of physical uplink control channel (PUCCH) resources; decode downlink control information (DCI) signaling, the DCI signaling including a PUCCH resource indicator for selecting a set of PUCCH resources from the pre-configured candidate sets; determine an offset based on a resource index of a physical downlink control channel (PDCCH) resource used for communicating the DCI signaling; and encode uplink control information (UCI) for transmission on a PUCCH resource from the selected set of PUCCH resources, wherein an index of the PUCCH resource is based on the PUCCH resource indicator and the determined offset.

In Example 26, the subject matter of Example 25 includes, wherein the resource index of the PDCCH resource includes one of the following: an index of a control channel element (CCE) used for transmission of the DCI signaling; an index of a control resource set (CORESET) associated with the DCI signaling; and a physical resource block (PRB) index of PRBs used for transmission of the DCI signaling.

In Example 27, the subject matter of Examples 25-26 includes, wherein the instructions further cause the UE to: decode second configuration information including at least one UE-specific constant value; and determine the offset further based on the at least one UE-specific constant value.

In Example 28, the subject matter of Example 27 includes, wherein the configuration information and the second configuration information are received via higher layer signaling, wherein the higher layer signaling includes one of: minimum system information (MSI) signaling; remaining minimum system information (RMSI) signaling; other system information (OSI) signaling; and radio resource control (RRC) signaling.

In Example 29, the subject matter of Examples 27-28 includes, wherein the instructions further cause the UE to: apply the determined offset to additional PUCCH configuration information received via the second configuration information and associated with the selected set of PUCCH resources.

In Example 30, the subject matter of Example 29 includes, wherein the additional PUCCH configuration information includes at least one of the following: a starting cyclic shift index for shifting a PUCCH resource; an orthogonal cover code (OCC) index; and a combined resource index, the combined resource index including a starting PRB index for PUCCH transmission, the starting cyclic shift index, and the OCC index.

In Example 31, the subject matter of Examples 25-30 includes, wherein the UCI includes one or both of a hybrid automatic repeat request acknowledgement (HARQ-ACK) feedback information and a scheduling request (SR).

Example 32 is at least one machine-readable medium including instructions that, when executed by processing circuitry, cause the processing circuitry to perform operations to implement of any of Examples 1-31.

Example 33 is an apparatus comprising means to implement of any of Examples 1-31.

Example 34 is a system to implement of any of Examples 1-31.

Example 35 is a method to implement of any of Examples 1-31.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

What is claimed is:

1. An apparatus comprising:
processing circuitry configured to perform operations to configure a user equipment (UE) for communicating uplink control information (UCI), wherein the operations include:
decoding physical uplink control channel (PUCCH) configuration information received from a base station;
determining a PUCCH resource on a set of symbols for PUCCH transmission, wherein the determined PUCCH resource includes a physical resource block and cyclic shift value, wherein the determined PUCCH resource is dependent on whether a positive or negative acknowledgement is to be transmitted;
applying the cyclic shift value to a PUCCH base sequence, to generate a cyclically shifted PUCCH sequence; and
encoding the cyclically shifted PUCCH sequence for transmission to the base station using the physical resource block on the set of symbols for PUCCH transmission, wherein the cyclically shifted PUCCH sequence carries the positive or negative acknowledgement.

2. The apparatus of claim 1, wherein the PUCCH configuration information includes a cyclic shift hopping pattern, wherein said applying the cyclic shift value to the PUCCH base sequence is based on the cyclic shift hopping pattern.

3. The apparatus of claim 2, wherein the cyclic shift hopping pattern is based on one or more of the following:
a physical cell ID of a cell of the base station, wherein the cell includes the UE;
a virtual cell ID of the cell;
a symbol index of the determined PUCCH resource; and
a slot index of a PUCCH resource.

4. The apparatus of claim 1, wherein the cyclically shifted PUCCH sequence also carries a scheduling request (SR).

5. The apparatus of claim 1, wherein the cyclically shifted PUCCH sequence includes a long duration PUCCH sequence.

6. The apparatus of claim 1, wherein the cyclically shifted PUCCH sequence includes a short duration PUCCH sequence.

7. The apparatus of claim 1, wherein the PUCCH configuration information includes a cell-specific base sequence hopping pattern, wherein the cell-specific base sequence hopping pattern is configured to vary on one or both of a symbol basis and a slot basis, wherein the operations also include selecting the PUCCH base sequence from a plurality of available PUCCH base sequences based on the cell specific base sequence hopping pattern and uplink control information, wherein the uplink control information includes the positive or negative acknowledgement.

8. The apparatus of claim 1, wherein the operations also include:
encoding short duration PUCCH information to carry one or two bits of the UCI information within two symbols of the set of symbols for PUCCH transmission, wherein the short duration PUCCH information includes a first PUCCH sequence for PUCCH information to be transmitted in a first symbol of the two symbols, the first PUCCH sequence being generated by applying a first cyclic shift to the PUCCH base sequence.

9. The apparatus of claim 1, further comprising:
radio frequency circuitry coupled to the processing circuitry; and
one or more antennas coupled to the radio frequency circuitry.

10. A non-transitory computer-readable storage medium that stores instructions for execution by one or more processors of a user equipment (UE), the instructions to configure the one or more processors to cause the UE to:
decode configuration information including pre-configured candidate sets of physical uplink control channel (PUCCH) resources;
decode downlink control information (DCI) signaling, the DCI signaling including a PUCCH resource indicator for selecting a set of PUCCH resources from the pre-configured candidate sets;
determine an offset based on a resource index of a physical downlink control channel (PDCCH) resource used for communicating the DCI signaling; and
encode uplink control information (UCI) for transmission on a PUCCH resource from the selected set of PUCCH resources, wherein an index of the PUCCH resource is based on the PUCCH resource indicator and the determined offset.

11. The apparatus of claim 1, wherein the cyclic shift value is a function of:
a cyclic shift configured by higher layers via UE specific radio resource control (RRC) signaling;
a slot index; and
a symbol index in accordance with a slot duration of 14 symbols.

12. An apparatus comprising processing circuitry configured to cause a base station (BS) to perform operations, wherein the operations include:
encoding physical uplink control channel (PUCCH) configuration information for transmission to a user equipment (UE);
decoding PUCCH information from the UE, wherein said decoding the PUCCH information includes decoding a cyclically shifted PUCCH sequence from a PUCCH resource, wherein the PUCCH resource includes a physical resource block and a cyclic shift value, wherein the PUCCH resource depends on whether a positive or negative acknowledgement has been transmitted by the UE, wherein the physical resource block occurs on a set of symbols for PUCCH reception, wherein the cyclically shifted PUCCH sequence carries the positive or negative acknowledgement, wherein said cyclic shifted PUCCH sequence is related to a PUCCH base sequence by the cyclic shift value.

13. The apparatus of claim 12, wherein the PUCCH configuration information includes an indication of a cyclic shift hopping pattern.

14. The apparatus of claim 13, wherein the cyclic shift hopping pattern is based on one or more of the following:
a physical cell ID of a cell of the base station;
a virtual cell ID of the cell;
a symbol index; and
a slot index of a PUCCH resource.

15. The apparatus of claim 12, wherein the cyclically shifted PUCCH sequence includes a long duration PUCCH sequence.

16. The apparatus of claim 12, wherein the cyclically shifted PUCCH sequence includes a short duration PUCCH sequence.

17. The apparatus of claim 12, wherein the PUCCH configuration information includes a cell-specific base sequence hopping pattern, wherein the cell-specific base sequence hopping pattern is configured to vary on one or both of a symbol basis and a slot basis, wherein the UE is configured to selecting the PUCCH base sequence from a plurality of available PUCCH base sequences based on the cell specific base sequence hopping pattern and uplink control information, wherein the uplink control information includes the positive or negative acknowledgement.

18. The apparatus of claim 12, wherein the PUCCH information includes long duration PUCCH information and short duration PUCCH information multiplexed within the physical resource block.

19. The apparatus of claim 18, wherein the long duration PUCCH information is associated with a first user equipment (UE) within the cell, and the short duration PUCCH information is associated with a second UE within the cell.

20. The apparatus of claim 12, further comprising:
a radio transceiver coupled to the processing circuitry; and
one or more antennas coupled to the radio transceiver.

* * * * *